United States Patent
Aldrin et al.

(12) 
(10) Patent No.: US 6,612,522 B1
(45) Date of Patent: Sep. 2, 2003

(54) FLYBACK BOOSTER WITH REMOVABLE ROCKET PROPULSION MODULE

(75) Inventors: Buzz Aldrin, Los Angeles, CA (US); Hubert P. Davis, Canyon Lake, TX (US)

(73) Assignee: Starcraft Boosters, Inc., Houston, TX (US)

(*) Notice: Subject to any disclaimer, the term of this patent is extended or adjusted under 35 U.S.C. 154(b) by 0 days.

(21) Appl. No.: 09/508,504

(22) PCT Filed: Mar. 17, 1998

(86) PCT No.: PCT/US99/03750

§ 371 (c)(1),
(2), (4) Date: Aug. 20, 2000

(87) PCT Pub. No.: WO99/47418

PCT Pub. Date: Sep. 23, 1999

Related U.S. Application Data

(60) Provisional application No. 60/078,277, filed on Mar. 17, 1998.

(51) Int. Cl.[7] .................................................. B64G 1/14
(52) U.S. Cl. ........................... 244/2; 244/55; 244/58; 244/172
(58) Field of Search ............................. 244/2, 158 R, 244/58, 54, 55, 172

(56) References Cited

U.S. PATENT DOCUMENTS

| | | | | |
|---|---|---|---|---|
| 3,060,685 A | * | 10/1962 | Tonnies et al. | 244/55 |
| 3,215,372 A | * | 11/1965 | Price | 244/54 |
| 3,276,722 A | * | 10/1966 | Eggers, Jr. et al. | 244/162 |
| 3,369,771 A | * | 2/1968 | Walley et al. | 244/162 |
| 3,646,761 A | * | 3/1972 | Norman et al. | 90/270 R |
| 3,672,606 A | * | 6/1972 | Walley | 244/2 |
| 3,737,119 A | * | 6/1973 | Cheng | 244/55 |
| 3,929,306 A | * | 12/1975 | Faget et al. | 244/162 |
| 4,796,839 A | * | 1/1989 | Davis | 244/160 |
| 5,129,602 A | * | 7/1992 | Leonard | 244/2 |
| 5,143,327 A | * | 9/1992 | Martin | 244/160 |
| 5,190,246 A | * | 3/1993 | Mac Conochie | 244/54 |
| 5,217,188 A | * | 6/1993 | Thole et al. | 244/172 |
| 6,119,985 A | * | 9/2000 | Clapp et al. | 244/172 |

* cited by examiner

*Primary Examiner*—Galen L. Barefoot
(74) *Attorney, Agent, or Firm*—Arthur M. Dula

(57) ABSTRACT

A flyback booster (200) comprising an aircraft (203) housing a launch vehicle stage as a removable rocket propulsion module (502) and several space launch vehicles using variations of the flyback booster (200) are disclosed. This flyback booster (200) functions as the first stage of a multistage space launch vehicle. The stage used in the flyback booster (200) and the upper stages of the multistage space launch vehicle (213) are selected to optimize the launch cost for a specific payload.

1 Claim, 18 Drawing Sheets

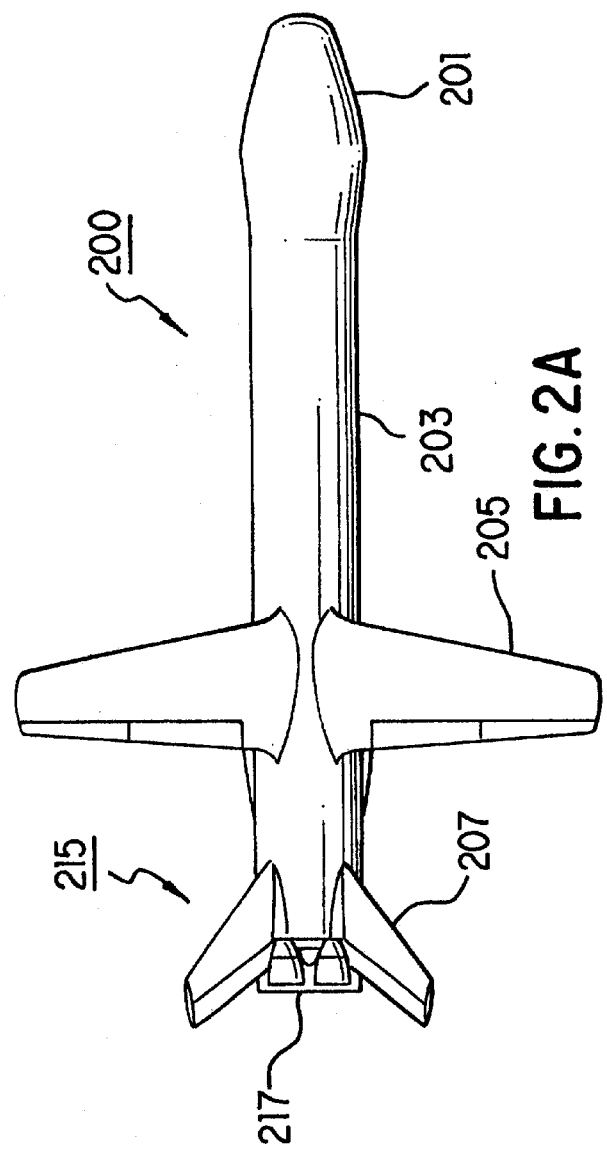
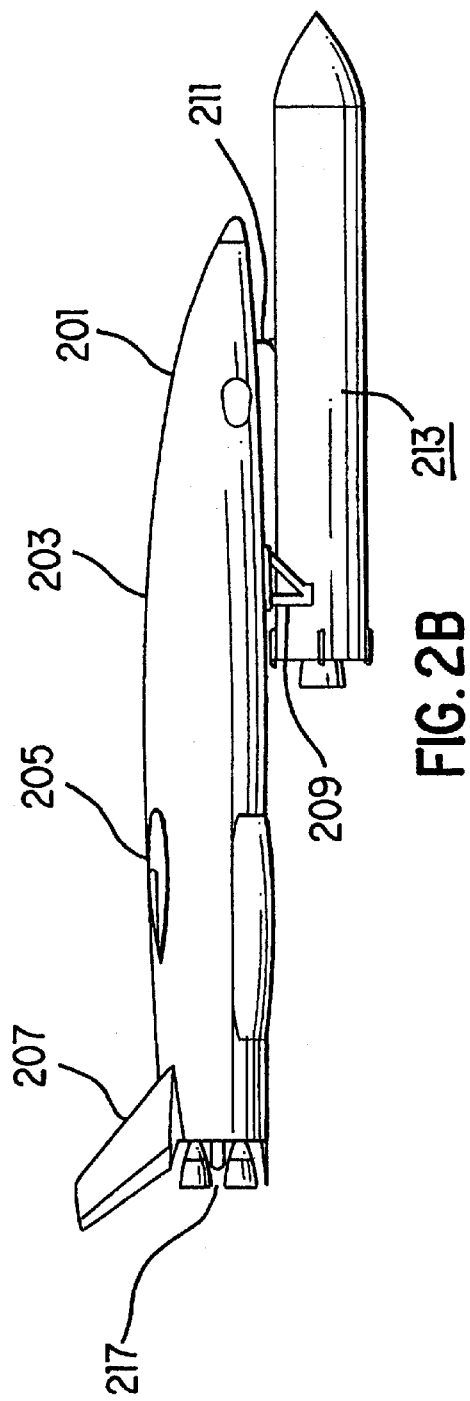
FIG. 2A
FIG. 2B

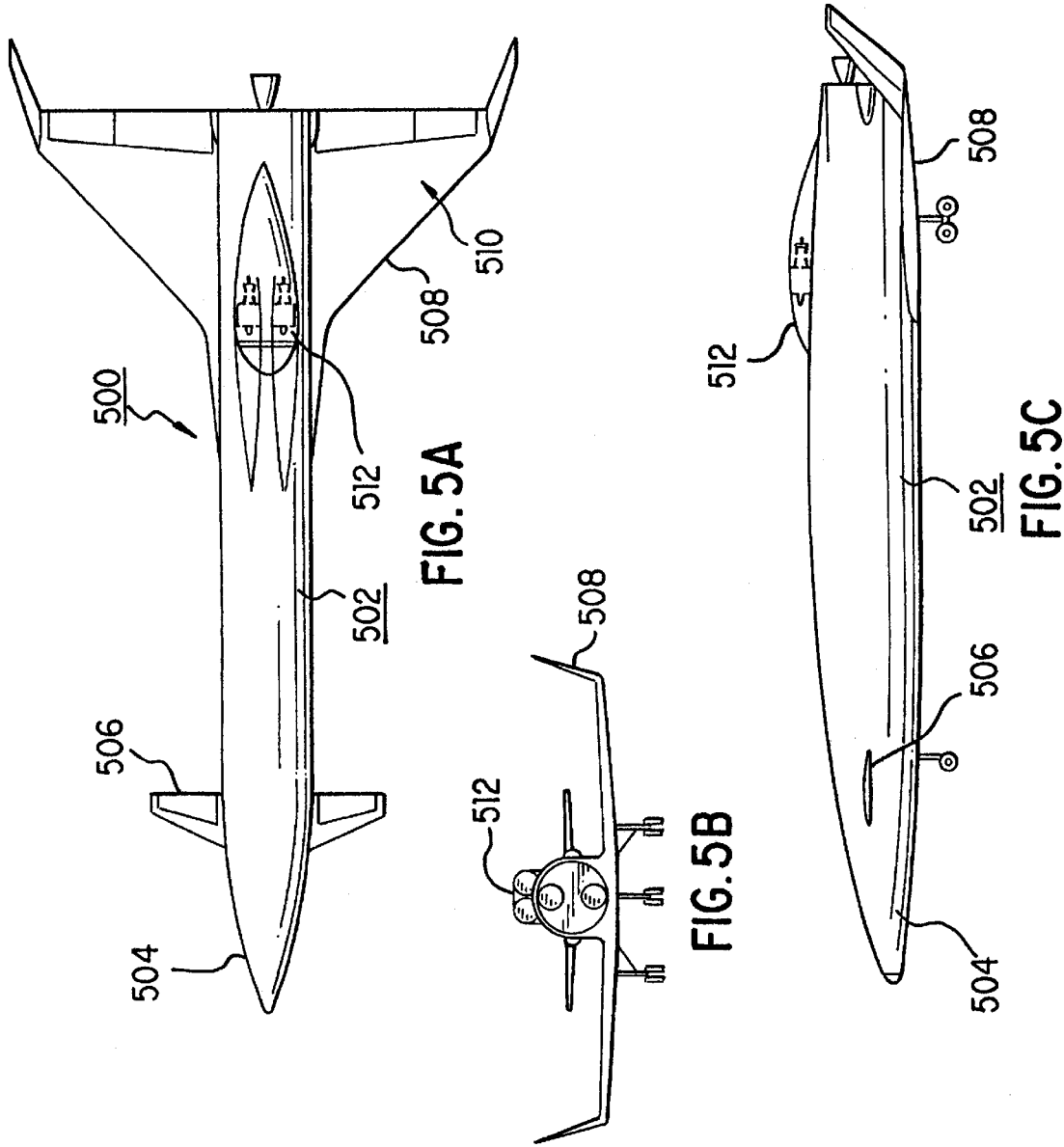

FLYBACK BOOSTER WITH REMOVABLE ROCKET PROPULSION MODULE

RELATED APPLICATIONS

This application claims the filing date of U.S. Provisional Patent Applications Ser. No. 60/078,277, filed on Mar. 17, 1998, with respect to the inventions disclosed in the cited provisional application.

TECHNICAL FIELD

The present invention relates generally to an apparatus used for aiding in the transport of payloads from the Earth's surface to outer space. Specifically, the present invention relates to a reusable flyback booster that incorporates a removable rocket propulsion module within an airframe. Still more specifically, the present invention relates to a reusable flyback booster comprising an aircraft, having air breathing engines and capable of landing on a runway, said aircraft functionally enclosing a separate launch vehicle stage. The present invention may be used as the first stage of a multistage launch vehicle. Thus the present invention also relates to a comprehensive launch vehicle system architecture wherein the stage used in the flyback booster and the upper stages are selected to cost optimize the multistage launch vehicle for launch of a specific payload or class of payloads.

BACKGROUND ART

The present invention's background art is generally found in the art of space launch vehicles. Patents in this field of art are classified generally in international class B64G and in U.S. class 244.

The inventors identify the following background art because they believe it will be useful in understanding, searching, and examining the invention. This invention lies in an area of the technical arts where it really is necessary to be a rocket scientist to understand the invention. The inventors anticipate that they may be required to explain the invention to persons who are not technically trained, such as administrators, jurists or judges. To aid in understanding the present inventors they offer: 1. an overview of information on space launch vehicles, including some technical and cost data on certain specific vehicles; 2. information on the background art related to partially reusable launch systems and 3. relevant U.S. patents. Taken as a whole, this body of information represents the current state of the art in launch vehicle recoverable boosters, as the inventors know it at the time of their filing of this patent application. It also illustrates the enormous complexity of this field of art, which is currently in a dynamic period of development.

Background of Space Launch Vehicles

Although sounding rockets may reach altitudes above the atmosphere of the Earth, the term space launch vehicle is applied usually to those rocket boosters designed to place satellites in orbit or to impart Earth-escape velocity to spacecraft.

By about 1950 the technology of rocket propulsion had reached a level at which consideration of a project to launch an Earth satellite became feasible. Worldwide scientific studies during the IGY of 1957–58 provided the basis for funding. In 1955 both the United States and the Soviet Union announced satellite programs as part of their national effort in the IGY.

When Sputnik 1 and 2 were launched in 1957 the Soviet Union released no details of their launch vehicles. In May 1958 Sputnik 3, weighing nearly 1,360 kilograms, was launched. It was not until 1967 that the basic Soviet launch vehicle was displayed. It was a 2½-stage vehicle of the "A" series (in this case, "A-1"): two stages with four drop-away booster pods. Each booster pod contained four rocket engines (totaling 16) with propellant tankage, and the central core had four engines. Propellants were liquid oxygen and kerosene.

The United States launched its early satellites with two different vehicles, the Jupiter-C and Vanguard. Jupiter-C was a modified Redstone liquid-propellant ballistic weapon of medium range to which were added more tankage length and three upper stages of clustered solid-propellant rockets. The modification was originally designed to achieve a velocity of six kilometers per second to test a nose cone (reentry vehicle). The desired velocity was obtained with two upper stages, one a cluster of four solid-propellant rockets and the other a single rocket. By increasing the final velocity 1.5 kilometers per second to the required 7.5 kilometers per second, satellite velocity could be obtained for a small scientific payload. The additional velocity was obtained by adding another stage with a cluster of solid-propellant rockets so that the upper stages consisted of 11, three, and finally one rocket carrying a payload weighing 8.2 kilograms. In 1954 the Army Ballistic Missile Agency and the Office of Naval Research jointly proposed this scheme, known as Project Orbiter, but a newly designed Vanguard launch vehicle was selected. Failures in early attempts to launch Vanguard, however, resulted in eventual approval of the Project Orbiter approach. Thus the first U.S. satellite, Explorer 1, was launched by a Jupiter-C on Jan. 31, 1958.

The Vanguard launch vehicle was a three-stage booster approximately equal in length (about 22 meters) to the Jupiter-C but much lighter in takeoff weight (10,250 kilograms compared to 29,000 kilograms). Vanguard launched its first satellite (1.4 kilograms) into high orbit on Mar. 17. 1958. After a few more flights, the Jupiter-C was retired in 1958 and the Vanguard in 1959.

During the 1960s the United States developed a series of standard launch vehicles. The Air Force modified a Titan II intercontinental ballistic missile (ICBM) for space launch purposes by strapping two solid-propellant booster rockets, three meters in diameter, to the liquid-propellant core vehicle. The Titan IIIC was used for large military satellites. Then NASA increased performance of the obsolete Thor intermediate-range ballistic missile (IRBM) by adding solid-propellant boosters. A liquid oxygen/liquid hydrogen upper stage, Centaur, was used on obsolete Atlas and Titan ICBMs to launch large spacecraft.

The Saturn series of NASA launch vehicles was developed specifically for the Apollo lunar mission program. The two operational Saturn models were the two-stage Saturn IB and three-stage Saturn V. The Saturn IB was used for Earth orbital developmental missions of Apollo, while the Saturn V was employed for lunar missions. Saturn V stood 110.6 meters high and weighed over 2,700,000 kilograms at launch. It could place 104,000 kilograms in orbit and send 45,000 kilograms to escape velocity.

For some years the launching of spacecraft was limited to the United States and the Soviet Union. The reason was that the early rocket-powered launch vehicles were based on long-range ballistic missiles, which only these countries had developed. France was the third nation to launch a satellite (1965), followed by Japan (1970), the People's Republic of China (1970), and the United Kingdom (1971). Under the auspices of the European Space Agency (ESA), the nations of Western Europe developed the Ariane expendable launcher during the 1970s to assure themselves of independent launch capability. This action was taken, in part, in response to the U.S. refusal to guarantee flights for communications satellites that might compete with U.S. telecommunications carriers. A three-stage vehicle that burns storable and solid propellants in its first two stages and employs a cryogenic engine in its third, Ariane has become a formidable competitor for commercial space launch services, capturing about half of the global market. It is capable of launching two satellites of the U.S. Delta class (an Earth-orbit payload of 1,770 kilograms) at one time or one Atlas-Centaur-class satellite (an Earth-orbit payload of 4,670 kilograms). With the new cryogenic propellant core, Ariane is approaching payload weights that only the Shuttle can handle.

Specific Launch Vehicles—Cost of Launch Vehicles

An important factor affecting space mission cost is the cost of launch vehicles. Many of the major launch vehicles are designed to place payloads of 1500–6000 kg into geostationary transfer orbit, at a typical cost of $50M–150M. Such launch performance is to little and costs are far too high for the low-cost missions satellite operators require.

Small Expendable Launchers

Many of the early Western space launchers had, by modern standards, very small payloads. The U.S. Vanguard rocket could place 20 kg into LEO, whilst the French Diamant and British Black Arrow both had LEO capabilities of approx 50 kg. From the mid-1960s onwards launcher development concentrated on increasing payload weight, but during the 1980s the growing interest in small satellite development lead to a number of small and (relatively) low-cost launchers being produced. A further source of small launchers opened up in the late 1980s with the decommissioning of many U.S. and former Soviet nuclear missiles. Russia in particular has been keen to convert former military missiles into launchers which can be sold for foreign currency.

Information on Existing and Proposed Launch Vehicles

Unless otherwise specified LEO (Low Earth Orbit) and polar orbit payload data are for a 100 nm orbit. LEO performance is generally given for the lowest inclination achievable from the vehicle's main launch site. In some cases, sources provide performance data for non-standard orbits without explicitly saying so. This can introduce some errors into the data for less common vehicles.

GTO stands for Geostationary Transfer Orbit, and should not be confused with GEO, Geostationary Earth Orbit. The satellite or an attached apogee kick motor generally performs the impulse from GTO to GEO, so launch vehicles often specify only GTO capability.

Price and performance data may vary. Launch prices depend on the spacecraft, currency exchange rates, and market fluctuation. Payload depends on fairing and adapter selection. This data should be accurate enough to make comparisons and conduct preliminary analysis.

It is difficult to find comprehensive data for some Russian or Chinese systems since they were often secret, and data on the more obscure foreign launch systems doesn't get published very frequently. When data is available, sources sometimes disagree. Therefore, reliability data for a few launchers may be out of date or inaccurate.

| CURRENT LAUNCH VEHICLE DATA: Vehicle \| Payload kg (lbs) \| Reliability \| Price (nation) \| LEO Polar GTO \| | | | |
|---|---|---|---|
| Ariane | Ariane 4: 39/42 92.8% (ESA) | | |
| AR40 | 4900 (10,800) | 3900 (8580) | 1900 (4190) | $65 m |
| AR42P | 6100 (13,400) | 4800 (10,600) | 2600 (5730) | $67 m |
| AR44P | 7725 (17,000) | 5500 (12,100) | 3000 (6610) | $70 m |
| AR42L | 7400 (16,300) | 5900 (13,000) | 3200 (7050) | $90 m |
| AR44LP | 8300 (18,300) | 6600 (14,500) | 3700 (8160) | $95 m |
| AR44L | 9600 (21,100) | 7700 (16,900) | 4200 (9260) | $115 m |
| *AR5 | 18,000 (39,600) [300nm] | 6920 (15,224) | 0/0 | $105 m |

The Ariane 4 series holds the largest market share in the international commercial launch market. Development is funded by the European Space Agency and lead by CNES, the French space agency. Arianespace conducts operations. The vehicles launch from French Guiana in South America. Ariane 5 was designed to launch multiple large communications satellites for a lower cost than previous versions. However, satellites have continued to grow since the program was started almost ten years ago. There is speculation that Ariane 5 will eventually be too small to launch two satellites, but too large to launch just one. Therefore, ESA has approved a roughly $1–2 billion "Ariane 5 Evolution" project to increase GTO payload to about 7.4 tons in small increments after to the year 2000.

| Atlas | 32/37 86.5% in last 10 years (USA) | | | |
|---|---|---|---|---|
| Atlas I | 5580 (12,300) | 4670 (10,300) | 2250 (4950) | $70 m |
| Atlas II | 6395 (14,100) | 5400 (11,900) | 2680 (5900) | $75 m |
| Atlas IIA | 6760 (14,900) | 5715 (12,600) | 2810 (6200) | $85 m |
| Atlas IIAS | 8390 (18,500) | 6805 (15,000) | 3490 (7700) | $115 m |

Atlas is the largest commercial launch vehicle in the U.S. and is used frequently for commercial and military launches. Starting in the summer of 1995, Atlas was marketed jointly with the Russian Proton vehicle by International Launch Services, a joint venture of Lockheed Martin and Russian aerospace companies. This offers more flexibility for customers.

| Vehicle | Payload kg (lbs) | | | Reliability (nation) | Price |
|---|---|---|---|---|---|
| | | LEO | Polar | GTO | |
| Delta | 48/49 98% in last 10 years (USA) | | | | |
| Delta Lite w/o SSRM | 1985 (4365) | 1510 (3320) | 660 (1450) | | ~$25 m |
| Delta Lite w/ SSRM | 2610 (5740) | 2030 (4465) | 860 (1890) | | ~$25 m |
| Delta 7925 | 5,045 (11,100) | 3,830 (8,420) | 1,820 (4,000) | | $50 m |

The Delta launch vehicle family is built and marketed by McDonnell Douglas (now Boeing). The Delta II has proved reliable, but is too small for most geosynchronous satellites. Therefore, McDonnell Douglas is developing the Delta III, with a much larger payload. Hughes has purchased 10 launches for its satellites. New Delta versions were also designed for NASA's Med-Lite contract, which sought launch vehicles between the size of small launchers like Pegasus, and the Delta II, which was the smallest of the large launchers. The smaller Delta versions will be used for future Mars missions, among other things

| Vehicle | Payload kg (lbs) | | | Reliability (nation) | Price |
|---|---|---|---|---|---|
| | | LEO | Polar | GTO | |
| H series | 12/12 100% (Japan) | | | | |
| H-2 | 10,500 (23,000) | 6600 (14,500) | 4000 (8800) | 3/3 | $160 m |

The H-2 is the first Japanese launch vehicle to be entirely developed domestically. Previous N series and H-1 vehicles used Delta components. The H-2 is designed to carry heavy payloads to orbit and has worked well so far. However, it is unlikely to be commercially attractive in the near future, due to high costs and low flight rates. NASDA hopes to cut costs by as much as 50% by the turn of the century, in part by simplifying the design and including some foreign components. The H-2 is the cornerstone of NASDA's plans for increasing activities in space, including eventual human missions.

| Kosmos | 371/377 98.4% (Russia) | |
|---|---|---|
| Kosmos | [400 km circular orbit] 51 degrees-1400 kg 83 degrees-1105 kg | $25 |

Kosmos (also spelled Cosmos) is a Russian vehicle comparable in size to the American OSC Taurus launch vehicle. Following back to back failures of the Pegasus XL, LLV. and Conestoga in the summer and fall of 1995, Kosmos attracted attention in the United States as an alternative launcher with a more reliable history. Several companies have worked out joint agreements with the manufacturer, Polyot. Assured Space Access appears to be the current favorite, although other companies have also been involved. Final Analysis Inc. has reserved a number of launches for its own use and is marketing extra payload space on those launches. Kosmos has reached orbit at least 389 times.

| Lockheed Launch Vehicle (Athina) 3/1 66% (U.S) | | | | |
|---|---|---|---|---|
| Athina 1 | 795 (1,755) | 515 (1140) | — | $16 m |
| Athina 2 | 1,985 (4,835) | 1490 (3,145) | 593 (1305) | $22 m |
| Athina 3 | 3,655 (8,060) | 2,855 (6,295) | 1,136 (2,500) | $27 m |

The first flight of the LLV-1 (now called Athina 1) failed during the summer of 1995 when the vehicle began pitching out of control. Fortunately, the vehicle had a good order book for such a new vehicle, including NASA's Lewis and Clark satellites, and the Lunar Prospector mission. Therefore the LLV overcame this initial setback.

| Vehicle | Payload kg (lbs) | | | Reliability (nation) | Price |
|---|---|---|---|---|---|
| | | LEO | Polar | GTO | |
| Pegasus/Taurus | 7/9 77% (USA) | | | | |
| Pegasus XL | 455 (1,000) | 365 (800) | 125 (275) | 0/2 | $13.5 m |
| Taurus | 1,450 (3,200) | 1,180 (2,600) | 375 (830) | 1/1 | $15 m |

Pegasus was the first new American vehicle in more than a decade, and deserves some credit for restarting the interest in small satellites. Pegasus is a small, all solid rocket vehicle built by Orbital Sciences Corporation. The winged rocket is launched from beneath the company's L1011 aircraft. The original Pegasus configuration is being phased out, in favor of the Pegasus XL (Extended Length). The first two Pegasus XL flights were failures.

Taurus was developed to meet military requirements for rapid launch of small spacecraft. It consists of Pegasus stages mounted atop a Castor 120 first stage.

| Proton | 96/103 93.2% in last 10 years (Russia) | | |
|---|---|---|---|
| Proton | 20,000 (44,100) | 5,500 (12,200) | $65 m |

Proton is the heavy lift workhorse of the former Soviet launch stable. It is being marketed in the west by International Launch Services, a joint venture between Krunichev and Lockheed Martin. ILS also offers the Atlas. Russia is currently limited to offering prices within 7.5% of western prices and the number of GEO launches is limited to 8 before the year 2000. However, there is speculation that these restrictions may be abandoned as Russian launches become more commercialized. ILS has twelve western contracts for Proton launches, starting in 1996 with an Astra satellite for Societe Europeenne de Satellites of Luxembourg. Proton is also scheduled to play an important role in launching space station components. Krunichev plans to offer new upper stages for Proton, including the storable propellant Breeze-M upper stage in 1998 and the OHSM cryogenic stage a few years later. Proton will put 3.2 tons in GEO with Breeze-M and 4.5 tons with OHSM. Current GEO capability is about 2.6 tons with the Block D upper stage. In addition to these technical changes. ILS is considering conducting Proton launches from Cape Canaveral, or sites in Australia or Brazil. Launching closer to the equator would increase performance.

| Shavit 3/3 100% (Israel) | | |
|---|---|---|
| Shavit | 160 (350) | $22 m |

Shavit is Israel's first, and so far only, launch vehicle. It is derived from the Jericho II ballistic missile. Israel Aircraft Industries is developing a more advanced version with an added stage, which would be called "Next." The payload of the new vehicle would be slightly higher than Pegasus, and a cost of $15 million has been suggested. Commercialization is desired because Israeli missions number less than one a year and have limited government support. In order to avoid dropping spent stages on Arab neighbors, Israel launches west over the Mediterranean, decreasing the vehicle's performance significantly.

| Vehicle | Payload kg (lbs) | | | Reliability | Price |
|---|---|---|---|---|---|
| (nation) | LEO | Polar | GTO | | |
| Titan | 26/30 86.7% in last 10 years (USA) | | | | |
| Titan II | 1,905 (4,200) | | | | $43 m |
| Titan IV/ SRM | 17,700 (39,000) | 14,100 (31,100) | 6,350 (14,000) | 10/11 | $315 m–$360 m |
| Titan IV/ SRMU | 21,640 (47,700) | 18,600 (41,000) | 8,620 (19,000) | 0/0 | $300 m |

Titan II vehicles are left over ballistic missiles that have been refurbished for space launch. They are used for polar orbiting Earth observation systems. It was a Titan II that launched Clementine. Titan IV is used mainly for large military payloads, including Milstar communications spacecraft and classified intelligence platforms. A Titan IV is also booked to launch NASA's Cassini mission to Saturn. Note that because all Titan IV launches are government missions, and most are classified, prices are subject to debate.

| Zenit 22/25 88% (Russia) | | | | |
|---|---|---|---|---|
| Zenit | 13,740 (30,300) | 11,380 (25,090) | 4300 (9480) | %65 m |

Zenit is the newest of the large former Soviet vehicles, having come online in 1985. It suffered three consecutive failures between 1990 and 1992. NPO Yuznoye manufactures Zenits in Ukraine. Boeing has a joint venture with NPO Yuznoye and the Norwegian marine engineering company Kvaemer to launch Zenits from a modified oil platform. Due to the lower launch site latitude and a new upper stage from RSC Energia, performance will increase. Payload to GTO will increase to about 5400 kg. Payload to LEO will be about 13.000 kg.

X-34 (United States)

X-34 is a semi-reusable vehicle. Its development was funded in part by a $70 million contract with NASA. OSC, which spent a total of $100 million on the project, manage the project. Plans are for the vehicle to be carried atop a NASA 747 shuttle transporter and launched at altitude. The vehicle would reach roughly half of orbital velocity and eject a satellite with an expendable upper stage to reach orbit. Estimated price is around $4 million per launch.

EELV—Evolved Expendable Launch Vehicle (United States)

The U.S. Air Force has the responsibility for funding development of U.S. government ELV programs; EELV is their answer. The Air Force has provided about $1 billion to Boeing and Lockheed Martin each of them to develop a new launch vehicle that can launch all military spacecraft. Theoretically, the consolidation would mean high flight rates for these two launch vehicle types, thus lowering unit costs. These two vehicles are currently under active development.

A number of small space launch vehicles that could be used with the present invention are in planning and development. These include:

ESA/CNES Small Launchers (Europe)

ESA and the French space agency CNES have considered all manner of small launchers, be they solid or liquid, air launched or ground launched. Proposals have included derivatives of Ariane, various national missile programs, or Russian vehicles like Soyuz. The current study project is the European Small Launcher (ESL), an all solid vehicle which could launch one ton into a 700 km sun-synchronous orbit for $20 million.

Italian Small Launchers (Italy)

A variety of small launch vehicles have been studied and tested by the Italian space agency, University of Rome, and Italian aerospace firms. Generally the vehicles are derived from Scout components, since Italy has experience launching Scout rockets from their San Marco platform off the coast of Kenya. Various projects have gone by the names Vega, Zefiro, San Marco Scout, Advanced Scout, etc.

Kistler K-1 (United States)

Kistler is an aerospace company, which is using private funds to develop an all reusable, two stage small launch vehicle. Tests of hardware for the K-0, a subscale engineering test vehicle, have been conducted. The Kistler fleet would include the K-1, with a payload of 2000 pounds to LEO starting around the turn of the century, and the K-2 which would carry 6000 pounds a starting a few years later. Eventually, Kistler would like to build the K-3, which could launch 20,000 lbs. The company is releasing little public information, and management and engineering shakeups have been occurring, which could affect the design and timeline for the fleet. For more information, see the Kistler homepage at http://www.newspace.com/Industry/Kistler/home.html.

PacAstro (United States)

PacAstro now has at least three contracts; customers include KITcom of Australia which plans to launch satellites similar to Orbcomm, and the Swedish Space Corp. Much of the technology will be developed under contract with U.S. Air Force for a sounding rocket dubbed PA-X. The PA-2 would carry 340 kg (750 lbs) to LEO or 225 kg (500 lbs) to a polar orbit for $6 million dollars Rockot (Russia/Germany)

Rokot is a three stage liquid propellant launch system developed in Russia and funded in part by German companies. Eurockot Launch Services GmbH will market it. Rockot is derived from the SS-19 ICBM with an additional upper stage, and should be able to put about 1800 kg into low orbits.

Russian Small Launchers (Russia):

A large number of new small launch vehicles are being designed in Russia. They are usually derived from ICBMs or SLBMs. They include:

Riksha-1: Under development at NPO Energomash, to launch 1.7 tons to LEO for $10 million.

Surf: Sea-launched vehicle derived from the SSN-23 and SSN-20 submarine ballistic missiles.

Space Clipper: Air launched version of SS-24. This is a Ukraine venture. The manufacturer is NPO Yuzhone.

Seagull (Russia/Australia)

Russian organizations and the Australian Space Office are discussing a project to co-produce a liquid-fueled space launcher with a capacity of about one ton into low orbit. The vehicle would be a new design, though it would use a number of existing components. Launch would take place either from Woomera or a site on the northeast coast of Australia.

VLS (Brazil)

The VLS has been a long standing goal of the Agencia Espacial Brasileria and a major part of the Brazilian Complete Space Misson (MECB). The launcher is derived from the Sonda IV sounding rocket and is currently designed to put 185 kg into a 750 km orbit.

Reusable Launchers

A frequently-proposed solution to the high cost of access to space is the development of reusable launch vehicles. It has often been pointed out that if aircraft were built for every flight and scrapped thereafter, then air travel would be as expensive as space launch. Unfortunately the economic as well as technical challenges involved in building a reusable launch vehicle (RLV) are considerable, as is evident from the continued use of expendable launchers some 40 years after the launch of the first artificial satellite. The one operational launch vehicle with any degree of reusability the U.S. Space Shuttle, is as expensive to operate in terms of $/kg to LEO as most expendable launchers and requires a large support operation to refurbish each Orbiter after flight. The main difficulty with building a fully reusable launch vehicle, particularly one which is a single unit, is that of achieving orbital velocity (9,500 m/s including drag and gravity losses) without using disposable stages or tanks.

"Isp" the abbreviation for is a quantity known as the specific impulse of the particular propellant combination and rocket engine being used. Specific impulse is measured in units of pounds force per pounds mass per second, frequently shortened to "seconds". Commonly used propellants have values of Isp between 260s and 450s; to achieve a final velocity of 9,100 m/s with them would require a mass ratio of 8 to 35. Mass ratios much above 7.3 are very difficult to achieve, especially with any significant payload, using those propellants with sufficiently high Isp to allow lower mass ratios: liquid hydrogen as a fuel is low-density, leading to difficulty in building large tankage while maintaining the required mass ratio. Also, to maintain a reasonable level of acceleration at lift off, a launcher must carry heavy rocket engines that significantly vary its thrust during its burn. Expendable launchers drop off structure such as empty tanks and the large engines needed for takeoff, thus maintaining their effective mass ratio and lowering thrust throughout flight. Building an RLV as a single unit is thus an exceedingly difficult proposition.

In recent years, advances in materials technology have given rise to the hope that it may be barely possible to build a single-stage-to-orbit (SSTO) RLV. By using strong but light materials such as composites and advanced alloys it may be possible to build a vehicle light enough in relation to its size that it's mass ratio is high enough to achieve orbit with a useful payload. The NASA/Lockheed-Martin X-33 is being built as a technology demonstrator for such a vehicle, and should carry out suborbital flights in late 1999 or 2000. It is hoped by NASA that such work will lead to the commercial development of operational SSTO-RLVs within the next 10 years. An objective of such research is to develop an RLV that can be refurbished between flights with little more than the routine servicing required by conventional aircraft. Progress was made in this area by the McDonnell-Douglas DC-X/XA before it was lost in a flight accident, with successful demonstration of rapid turnaround by a small flight crew. If it is successful, this research could lead to an RLV that can fly at short notice (under a week) to deliver to orbit a payload at relatively low cost (under $1000/kg to LEO). Such a vehicle would be ideal as a launcher for rapid-response missions, as it would make it feasible to procure a dedicated launch into a specific parking orbit at short notice and at reasonable cost. However, as mentioned, it is unlikely that such a vehicle will enter operational service before 2007, with 2010–2015 or beyond being more likely. As such, whilst the launch of rapid-response missions is likely to become a much easier proposition with the development of SSTO-RLVs, this will not happen in the near future. Very low payload fractions and high risk and development costs of SSTO vehicles make many experts believe that they will never by a cost-effective means of launching significant payloads.

However, the SSTO-RLV is not the only approach to low-cost space access. Making any element of an ELV reusable should reduce costs. This is only true, however, so long as the element in question actually is easy to refurbish, and the cost of developing such a capability is not excessive. The U.S. Space Shuttle, for instance, reuses all elements except its external fuel tank. However, the high development cost and the effort involved in refurbishment between flights results in its cost to orbit being as high as most expendable launchers. Such savings are likely to be more pronounced if the part reused is the largest component, i.e. the first stage. The first stage is a particularly promising candidate for replacement, as not only does it have to carry the payload and upper stages, but it must overcome the most significant delta-V overheads (atmospheric/gravity drag) associated with launch. These overheads typically add 150–2,000 m/s to the delta-V required to reach normal LEO orbital velocity of 7,800 m/s. Even small improvements in this area can bring dramatic benefits. A good example is the Orbital Sciences Corporation (OSC) Pegasus air-launched rocket, which uses a converted L-1011 airliner as a reusable 'zeroth stage'. Even by taking the remaining stages to just 9,000 meters altitude and 250 m/s velocity, the required mass of a Pegasus rocket is approximately halved in takeoff weight from a ground-launched version of equivalent performance. An additional factor in making just the first stage reusable is that its recovery is much easier than for an SSTO. An SSTO returning from orbit must cope with re-entry at approximately Mach 25, whereas a reusable first stage would reach a peak velocity of Mach 3 to Mach 6.

A number of partly reusable launch vehicles (PRLV) have been proposed around the concept of a reusable first stage—often air-launched in some way—being used to boost the payload and upper stages onto a suborbital trajectory. During 1995 OSC carried out development work on the X-34, effectively a reusable vehicle that replaced the first stage of Pegasus. Although the X-34 has been redesigned as a suborbital test vehicle, other companies have made similar proposals. Kelly Space has begun development work on the Eclipse winged launcher that would be towed behind an airliner before climbing on rocket power into a trajectory where solid-propellant upper stages and the payload would be released from a cargo bay. Pioneer Rocketplane's 'Pathfinder' (originated as the U.S. Air Force 'Black Horse' spaceplane study) is a small spaceplane that enhances its performance via aerial propellant transfer. It takes off on a runway using two conventional augmented turbofan engines, carrying a full load of kerosene fuel but only sufficient liquid oxygen (LOX) oxidizer to accomplish the required propellant transfer. It rendezvouses with a tanker aircraft to take on a full load of LOX before using its LOX/kerosene rocket engine to climb to 100 km altitude at a speed of Mach 12. Here it releases a solid-propellant upper stage (typically a STAR48 or -63 boost motor), which accelerates the attached payload into orbit. The Pathfinder then re-enters and relights its turbofan engines to return to base. Aerial propellant transfer allows the Pathfinder to reduce structural weight as its wings and landing gear are sized to support a much lower weight than if it took off with a full propellant load. Speculations indicate that Pathfinder should be able to place 1,000 kg into polar LEO, or more into orbits of lower inclination, for an estimated cost of $5M. Pioneer is currently carrying out a design study on the Pathfinder for NASA as a contender for the Bantam-X RLV proposal; it is also a contender for the proposed USAF space sortie vehicle.

NASA is studying the possibility of using liquid fueled fly back boosters ("LFFB") as part of the U.S. National Space Transportation System, commonly called the "Space Shuttle." The LFBB is designed to be a completely reusable liquid-fueled booster that will return to the launch site, using an autonomous landing system, after separation from the Orbiter and external tank. By way of contrast, the current Shuttle SRBs have to be recovered from the ocean and then extensively refurbished for later use. The initial proposal for the LFBBs includes two options: "dual" boosters—two separate winged boosters; and "catamaran" boosters—a dual fuselage connected by a common wing. The catamaran version has been abandoned for technical reasons. Wind tunnels tests of the LFBB shuttle configuration have been conducted. Both Boeing and Lockheed Martin have performed concept definition studies of the LFFB. This work is continuing.

References

1. "International Reference Guide to Space Launch Systems" by Steven J. Isakowitz, 1991 edition. Published by AIAA.
2. "Transportation Systems Data Book" NASA Marshall SFC. Revision A 1995.
3. "1991–1992 Europe and Asia in Space," compiled by Nicholas Johnson and David Rodvold for USAF Phillips Lab.
4. As an additional source of information, NASA maintains a web page at http://www.ksc.nasa.gov/elv/elvpage.html which includes some information about expendable launch vehicles used by NASA.
5. "Capabilities, Costs, and Constraints of Space Transportation for Planetary Missions," by Karen Poniatowski and Michael Osmolovsky of NASA HQ's Launch Vehicle Office. This paper, along with papers on planetary capabilities of the Delta, Titan II and M-V were presented at the 1994 IAA International Conference on Low-Cost Planetary Missions, and are archived in Acta Astronautica, Vol. 35, 1995.
6. More recent information on launch vehicles may be found at www.jsc.nasa.gov/bu2/launch.html Background Art U.S. Patents U.S. Pat. No. 3,702,688 teaches a fully recoverable launch system consisting of two piloted winged vehicles that launched vertically in a mated configuration. A first larger booster vehicle was to have propelled the mated pair to an altitude of about 65 kilometers where the second vehicle was to be released. This system was never built.

U.S. Pat. No. 3,929,306 teaches a partially recoverable space shuttle system with rocket engines carried below an external fuel tank. The engines are recovered by loading them on board the Orbiter after their fuel is exhausted.

U.S. Pat. No. 4,557,444 teaches a dual structure SSTO aerospace vehicle having an aero shell structure and an internally disposed separable and reusable integral tank for its hydrogen fuel and its liquid oxygen.

U.S. Pat. No. 4,796,839 teaches a launch vehicle whose first stage rocket motors are ejected and recovered after first stage burnout when they by use of aeroshells and parachutes.

U.S. Pat. No. 4,834,324 teaches a space transportation system comprising several different modular units usable in a plurality of different configurations for different payloads and space missions. All units include aerodynamic devices such as fixed or swing-wings for a controlled returned to a runway landing on Earth.

U.S. Pat. No. 5,143,327 teaches a heavy lift launch vehicle having disposable fuel tanks and a plurality of winged flyback propulsion modules as a first stage.

U.S. Pat. No. 5,402,965 teaches the use of a carrier aircraft to fly a launch vehicle to a launch altitude and velocity. The significant teaching of this patent is the use of a detachable positioning apparatus that is recovered and reused from the launch vehicle.

U.S. Pat. No. 5,740,985 teaches a two-stage launch system, the first stage consisting of two flyback boosters or aircraft.

Having studied all of the prior art, the present inventors draw the following conclusions:

First, the main impediment to the development of space industry is not technical or engineering problems. It is purely economic. The high cost (now above $5,000 to $20,000 per kilogram) of launching payloads to space precludes significant development of a space industry, space tourism and the all other development of space as an ordinary venue for business and personal activities. Many econometric studies have shown that a cost reduction of at least one order of magnitude, to less than $1,000 per kilogram, will be required to make space a practical place to live and work.

Second, the greatest economic savings should come from the lowering of the costs of operating the first stage of any launch vehicle. One way to do this is to make the first stage booster reuseable. Hundreds of millions of dollars have been spent and thousands of engineers have worked for years on this problem. The original NASA proposal for the Space Shuttle included a fully reusable first stage, but was not accepted due to high development costs. This work, as, for example, on the LFBB, is continuing. Mountains of paper studies have been written on the problem. All of them require the development of entirely new rocket propulsion systems. Such novel systems are extremely expensive to design and test. The development costs of such systems have been found by past studies to largely negate the cost savings realized by the reusable booster.

Third, nothing in the prior art known to the present inventors teaches the use of an inexpensive existing booster stage as a removable propulsion module an aircraft that can function as a flyback first stage booster in a multistage launch vehicle system.

Disclosure of the Invention

The present invention is a flyback booster comprising an airplane housing a separable rocket propulsion module. The propulsion module may be a modified existing rocket stage, such as the Zenit, Atlas III or others; or it may be a newly designed and built rocket propulsion module.

The advantages of the present invention include separation, to the maximum extent possible, of the development, procurement and maintenance of the aircraft and rocket propulsion modules. This separation is expected to result in major economies in the procurement and operations of the launch system.

The removable rocket propulsion module may be lightly constructed because the airplane fuselage carries all aerodynamic and bending loads, transmits thrust to the payload and provides protection from externally generated heat and sound pressure levels. Attachment of the module to the fuselage and transmission of thrust loads from the module to the airplane is accomplished in its aft section of the propulsion module, with lateral motion constraints only on its forward section.

The present invention has a disadvantage. It increases the dry weight of the flyback booster. This is a relatively minor matter for a first stage booster because the first stage separates from its payload at about ten percent of orbital energy. If an existing "off the shelf" rocket propulsion stage is used as the removable propulsion module, its modification costs will be much less than the development and test costs required to build an integral tank rocket propulsion system. The inventors believe, as a result of their mathematical model of the present invention, that use of a separable rocket propulsion module will add only about ten percent to the dry weight of the flyback booster, compared to its weight if it were to be constructed with integral tanks as is taught by the prior art.

BRIEF DESCRIPTION OF THE DRAWINGS

FIG. 2 shows the StarBooster 350 embodiment of the present invention, which uses a Zenit first stage as a rocket propulsion module, adapted to be the first stage with Zenit second and third upper stages in a multistage space launch vehicle.

FIG. 5 shows the StarBooster 200 embodiment of the present invention, which uses the Atlas III first stage as its rocket propulsion module.

FIG. 23 is a table showing both the known input data and the assumptions used for the Atlas III/Dual StarBooster 200 embodiment of the present invention.

FIG. 24 is a table showing performance and estimated costs of some of the possible StarBooster 200 upper stage embodiments of the present invention.

BEST MODE FOR CARRYING OUT THE INVENTION

Figure 1A:
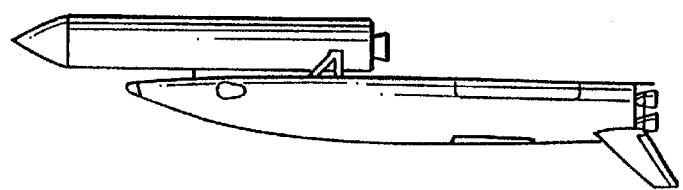
FIG. 1 is a table showing the StarBooster 350 embodiment of the fly back booster taught by the present invention adapted to serve as a first stage for a number of different upper stages to provide a multistage space launch vehicle.
Figure 1B:
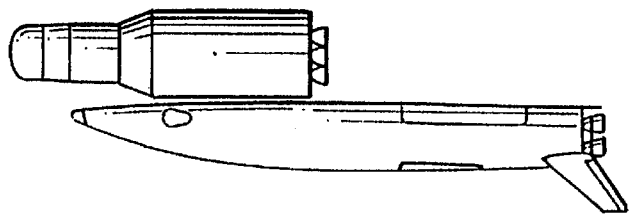
Figure 1C:
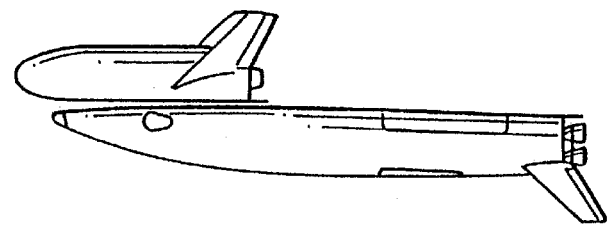
Figure 1D:
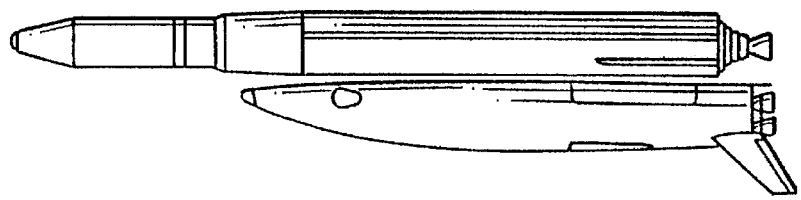
Figure 1E:
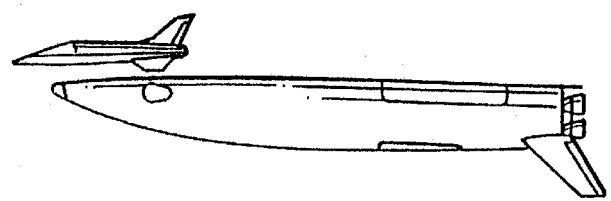
Figure 1F:
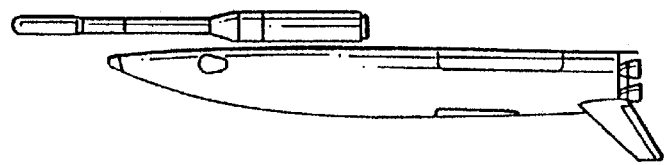
Figure 1G:
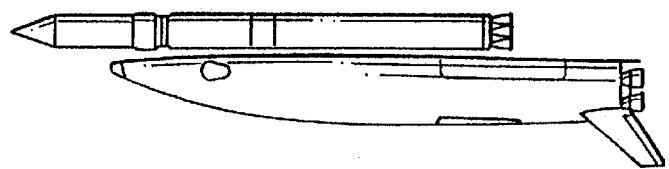

The present invention suggests converting an existing, expendable space launch vehicle first stage into a fully reusable system by housing it in a new, aluminum aircraft. This combination is called the "StarBooster". The term "StarBooster" or "fly back booster" will be used for the present invention in the remainder of this specification. The present invention will permit preservation, for repeated re-use, of 70% or more of the dry mass of launch vehicles. The StarBooster will be capable of withstanding vertical launch for rocket-powered ascent flight, separation from payloads at Mach numbers near 6.0, gliding hypersonic/supersonic flight to a heading for return to the launch site, turbofan powered subsonic cruise for the 300 NM or less return flight, and runway landing at airliner speeds.

Clean separation of the two functions, rocket-powered vertical launch for ascent and near-horizontal turbofan engine powered return flight, make possible limiting the development effort to the aircraft and its integration with existing, proven rocket stages. This will lower the development costs of equal importance, the time required to acquire a fully reusable booster; and will permit flight operations to begin with an established reliability record for the critical rocket components.

Furthermore, operational benefits are attained by permitting maintenance to be conducted on independent timelines for these two nearly independent elements of the fully reusable booster. Should the rocket require maintenance beyond that of the aircraft for re-flight, another pre-prepared rocket stage can be installed, facilitating rapid turn-around of the aircraft. The inverse is also true.

The initial rocket propulsion module studied for use with the StarBooster was the FSU Zenit first stage, powered by the world's most powerful liquid propellant rocket engine, the RD-170. This engine produces 1.73 million lbf thrust at sea level at a vacuum specific impulse of 337 lbf-sec/lbm. The Zenit first stage houses approximately 704,000 lbm of oxygen/kerosene propellants (about 350 short tons, hence the nomenclature "StarBooster 350"). The Boeing Company has selected the 12.8 ft. diameter Zenit three-stage vehicle to be employed in their Sea Launch international joint venture, which will expend the entire Zenit vehicle on each launch.

StarBooster and Several Potential Upper Stages

FIG. 1 illustrates the StarBooster 350, which is described in more detail below, as the first stage mated to several upper stages to make up multistage space launch vehicles. The embodiments shown are the StarBooster with the Sea Launch Zenit second and third stage; the Kistler K-1, the NASA X-34; the Boeing Delta IV; the Pioneer Pathfinder; the OSC Twin Taurus and the Ukrainian Ikar-2. Not all of these options will be exercised and some may not be feasible. In all of the embodiments, performance of the rocket vehicles carried by StarBooster will be multiplied by the boost to the hypersonic velocities provided by StarBooster launch. In the case of the Sea Launch Zenit, a payload loss of 30% is experienced due to the additional weight and drag of the StarBooster 350 compared to using the same Zenit first stage in the expendable mode as is now planned by Boeing.

StarBooster and Zenit

FIG. 2 shows a top and side view of the StarBooster 200 embodiment of the present invention mated to a Boeing Sea Launch Zenit second and third stage to form a multistage space launch vehicle. In FIG. 2, StarBooster 200 has a nose section containing airbreathing engines 201, a fuselage section with dual keel payload attachment means 203, an aerodynamic wing section 205, and an aerodynamic tail section 207. The front underside of fuselage 203 is connected by attachment means 209 and 211 to Boeing Sea Launch Zenit second and third stages 213. The Zenit rocket engine 217 projects out of the rear of tail section 207 which is part of the intelligent aft section, defined below, 215. The nose section with its novel air breathing engine section; the dual keel payload attachment means and the aerodynamic intelligent aft section are described in more detail below.

Novel Air-breathing Engine Section

The Problem

The StarBooster vehicle will be required to be assembled in a horizontal position, erected to the vertical position with its payload attached, ignite its RD-173 engine on the launch pad, ascend to between Mach 3 and Mach 6.5 near 150,000 feet altitude, cleanly separate from its payload shortly after propellant exhaustion, safely decelerate and climb from the separation velocity and altitude to out of the atmosphere, re-orient and re-enter the atmosphere, perform a supersonic turn to a heading toward the launch base, decelerate to subsonic velocity, ignite its gas turbine engines, perform high subsonic cruise flight to the landing pattern, and land on a runway near the launch pad.

This broadly disparate set of flight conditions poses a challenge in selecting the proper configuration for the air-breathing propulsion system required for cruise flight, as aerodynamic drag should be minimized for both ascent and subsonic cruise, the propulsion system protected until needed, the weight of the system minimized, and the heavy air-breathing engines located as far forward as possible in order to balance the heavy rocket engine necessarily mounted at the far aft end.

The Solutions of Others

NASA Johnson Space Center, Marshall Spaceflight Center, the Russian firm Energia, and Boeing-North American have all performed conceptual design studies of winged, liquid propellant flyback boosters (LFBB). The NASA and Russian studies have usually selected turbine engine locations on opposing sides of the fuselage, near the rear of the vehicle. The Boeing-North American design solution was originally a "catamaran" fixed geometry configuration which uses a large wing center panel mounting two large fuselage sections housing the rocket elements. The outboard wing panels provide a delta wing appearance. In this case, the location of the air-breathing engines has not been selected. But it is of no consequence as the catamaran configuration has been found to be not feasible due to cryogenic loads.

These solutions are considered to be likely to be both massive and complex, posing performance, development and production cost, and maintenance problems.

The StarBooster Solution

Figure 3C:
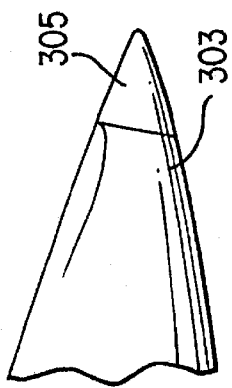
FIG. 3 shows a detail of the front section air breathing engines embodiment of the flyback booster of the present invention.
Figure 3B:
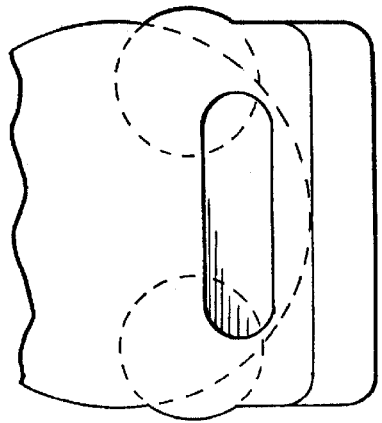
Figure 3A:
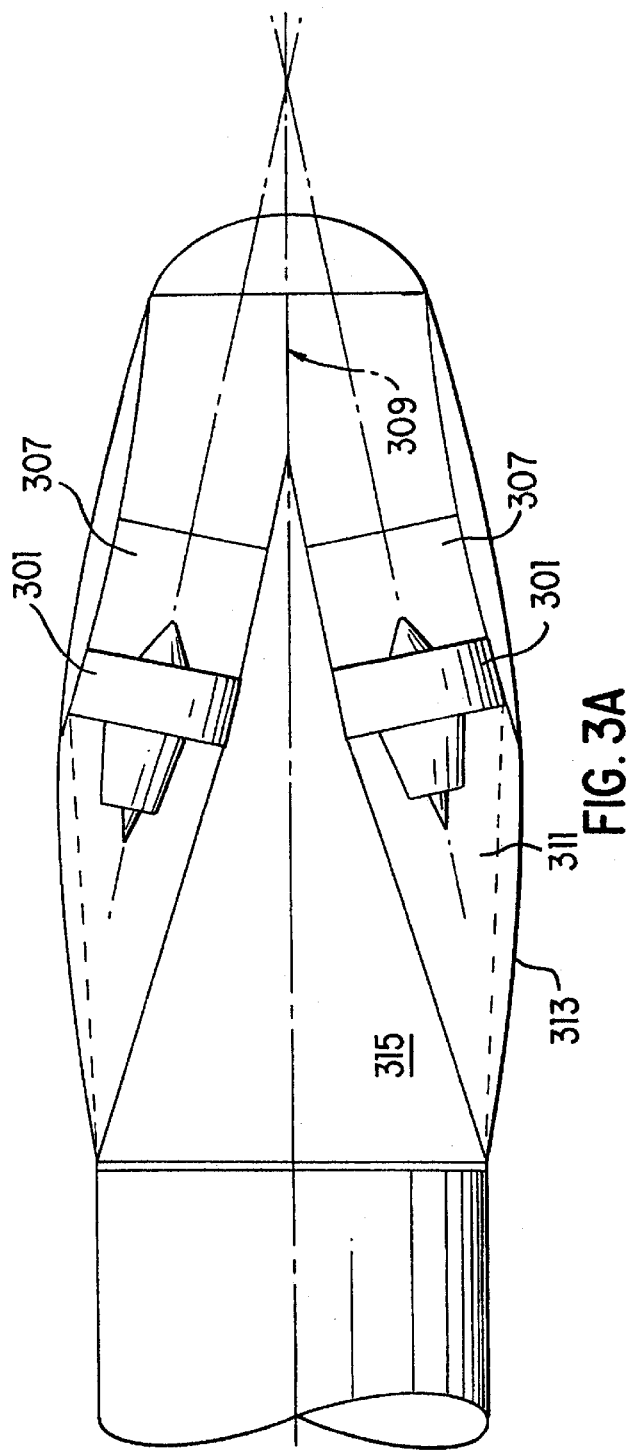

As shown in FIG. 3, mounting location for the air breathing turbofan engines internal to the forward fuselage was selected for the two engines 301, using a single, bifurcated inlet duct 303 on the nose of the fuselage which, in order to protect these engines, is covered by a nose cap 305 until subsonic flight is achieved after ascent flight and re-entry.

A one diameter "straight section" 307 forward of the engine fan face is provided in the aft portion of these inlet ducts to minimize disturbed flow at the fan face. Inlet lip design is to be optimized for cruise flight conditions of Mach 0.5 to 0.6, with "blow-in doors" provided if additional flow area is needed for takeoff.

Engine mounting is 15° to 20° off the vehicle platform centerline 309; selected to permit individual exhaust nozzle exits 311 on the two opposing sides of the fuselage. These exhaust exits are also to be covered by blow off panels 313 until needed in order to prevent hot gas ingestion. This arrangement was selected with the foreknowledge that an axial thrust loss of 3 to 6% would be experienced. This loss of efficiency is considered to be acceptable in light of the short duration of cruise flight.

The lateral force produced by each engine is 26 to 35% of thrust; the side force of one engine normally offsetting that of the other. Significant lateral control authority may thus be obtained by differential throttling, but "single engine" flight may be prohibited. With the high reliability of the modern airliner engines to be used by StarBooster and the relatively short interval of use, this is considered to be an acceptable risk. This engine arrangement was selected to provide minimum fuselage weight and low construction costs while providing acceptable engine performance and drag for the subsonic cruise portion of the mission. Fuel for up to a 1.5 hour flight to return to landing site is stored in fuel tank 315 located between and aft of the engines.

The advantages of this engine arrangement relative to other possibilities include:

1. Minimum aerodynamic drag during rocket-powered ascent flight.
2. Minimum aerodynamic drag during turbine-engine-powered subsonic cruise flight.
3. Protection for the air-breathing engines during ascent.
4. "Clean" free stream airflow entering the nose-mounted inlet duct opening.
5. Structural efficiency leading to a less massive engine installation.
6. Absence of the deployment mechanisms necessary for some alternative arrangements.
7. Lateral control through differential engine throttling.

Dual Keel Payload Attachment

The Problem

The StarBooster vehicle will be required to be assembled in a horizontal position, joined with a belly-mounted payload which may weigh up to several hundred tons at liftoff, ignite its 1.73 million pounds thrust RD-173 engine on the launch pad, ascend to between Mach 3 and Mach 6.5 near 150,000 feet altitude and cleanly separate from its payload shortly after propellant exhaustion. The payload rocket engines may either be reserved for use after separation from StarBooster (series burn) or ignited on the launch pad to assist the boost phase of flight (parallel burn).

Maintenance of directional control during ascent flight will require that the series burn payloads be mounted well forward, whereas the rocket engines exhaust of parallel burn payloads must be nearly in-plane with that of the RD-173 engine of StarBooster to avoid undesirable plume impingement. Thrust loads to the payload will be imparted at the rear via two belly-mounted trusses, and payload stabilization provided by a forward attachment to the StarBooster forward fuselage. Structural integrity and the required structural stiffness must be maintained at all times during ascent flight, separation, and the subsequent StarBooster solo maneuvers.

This broadly disparate set of loading conditions poses a challenge in selecting the proper configuration for the StarBooster fuselage structure, as girth and hence aerodynamic drag should be minimized for both ascent and subsonic cruise flight, flight control authority maintained through available engine gimbal movement, both StarBooster and its payload protected from excessive structural loads, the weight of the overall system minimized, and the payload mounting locations tailored to individual needs of the several candidate payloads. The location of the forward payload stabilization structure will be as far forward as possible for series burn payloads in order to place the composite vehicle ascent center-of-gravity forward of the composite aerodynamic center-of-pressure, and as required for parallel burn payloads The StarBooster Dual Keel Configuration The StarBooster 350 body is comprised of a hollow closed-cylinder structure to house and protect the Zenit-3 first stage rocket; StarBoster 200 is similarly constructed to protect its Atlas III first stage. Elongating the cylindrical cross-section to provide sufficient depth for fluid lines and cabling, with up to one-meter corner radii to minimize localized "hot spots" due to exit flight and re-entry heating, provides a nearly flat bottom surface. The wing spars pass over the fuselage for the StarBooster 350 and are faired by the fuselage.

The main landing gear of the StarBooster 350 is mounted in two "pods" beneath and laterally outboard of the Zenit rocket. The nose gear trunnions are mounted to the bulkhead separating the nose section from the rocket-carrying midbody. Two vertical beams extend forward from this bulkhead, converging near the flow splitter location in the forward portion of the turbine engine inlet ducts. This arrangement centralizes most of the major vehicle loads, minimizing the length of the load paths.

Dual keel refers to the use of the port and starboard segments of the lower half of the elongated closed cylinder cross section as a major load-carrying member, reacting initial loads of the payload during ascent flight and providing the necessary longitudinal beam stiffness. As the aluminum alloy fuselage skin must be thickened to act as an effective "heat sink" for aerodynamic heating thermal loads, significant load-carrying ability is present and is used for attachment of the dual payload thrust truss structures. A number of sets of matching "hard points" will be provided along these two deep beams by means of intermediate bulkheads, local stiffening and doubler plates. The location and number of pairs of "hard points" to be provided awaits more definition of the range of payload mass and the longitudinal locations of the thrust trusses desired by the integrated StarBooster/payload flight system.

The single forward payload stabilization fitting is attached either to the bottom of the StarBooster fuselage near the point of convergence of the vertical beams in the nose section or further aft to a centerline "bridge structure" connecting the two keel beams.

Aerodynamic Intelligent Aft Section

The Problem

The StarBooster vehicle will be required to be assembled in a horizontal position, erected to the vertical position, its RD-173 engine ignited on the launch pad, ascend to between Mach 3 and Mach 6 and near 150,000 feet altitude, separate from its payload shortly after propellant exhaustion, safely decelerate and climb from the separation velocity., perform a supersonic turn to a heading toward the launch base, decelerate to subsonic velocity, ignite its turbine engines, perform a high subsonic cruise to the landing pattern, and land on a runway near the launch pad.

This broadly disparate flight conditions pose a very real challenge in selecting the proper aerodynamic configuration, as stability must be maintained over flight conditions of the entire mission, aerodynamic drag should be minimized both for ascent and for subsonic cruise, and weight of the aerodynamic surfaces should be minimized.

The Solutions of Others

NASA Johnson Space Center, Marshall Spaceflight Center, the Russian firm Energia, and Boeing-North American have all performed conceptual design studies of winged liquid propellant flyback boosters (LFBB). Early NASA and Russian studies have selected folding wings, stowed for launch above the body, with a vertical axis pivot providing for aft rotation of the wingtips. For the Russian solution, additional variable geometry was selected—a vertical fin which folds laterally. The Boeing-North American design solution was a "catamaran" fixed geometry configuration which uses a large wing center panel to mount two large fuselage sections housing the rocket elements. The outboard wing panels provide a delta wing appearance. In all of these cases, a hinged body flap is provided for longitudinal (pitch) control which is mounted at the aft end of the fuselage, below the rocket engine exhaust nozzles.

These solutions are considered to be likely to be both massive and complex, posing performance, cost, and maintenance problems.

The StarBooster Solution

Early in the conceptual design process for StarBooster 350, an aft-mounted trapezoidal fixed wing of moderate aspect ratio and sweepback was selected to provide minimum wing weight and low construction cost while providing more acceptable lift-to-drag for the subsonic cruise portion of the mission than can be provided by the delta wing planform. This wing was placed on the fuselage to provide static longitudinal stability during subsonic flight, by placing the ¼ mean aerodynamic chord near the cruise flight center-of-gravity. A body flap was added to provide pitch control authority and to move aft the hypersonic trim point.

As the hypersonic center-of-pressure is at the centroid of the projected planform area, serious questions remain as to the adequacy of the aerodynamic surface area aft of the center-of gravity—it may be insufficient, with the vehicle tending to pitch nose up.

The Intelligent Aft Section

Figure 4A:
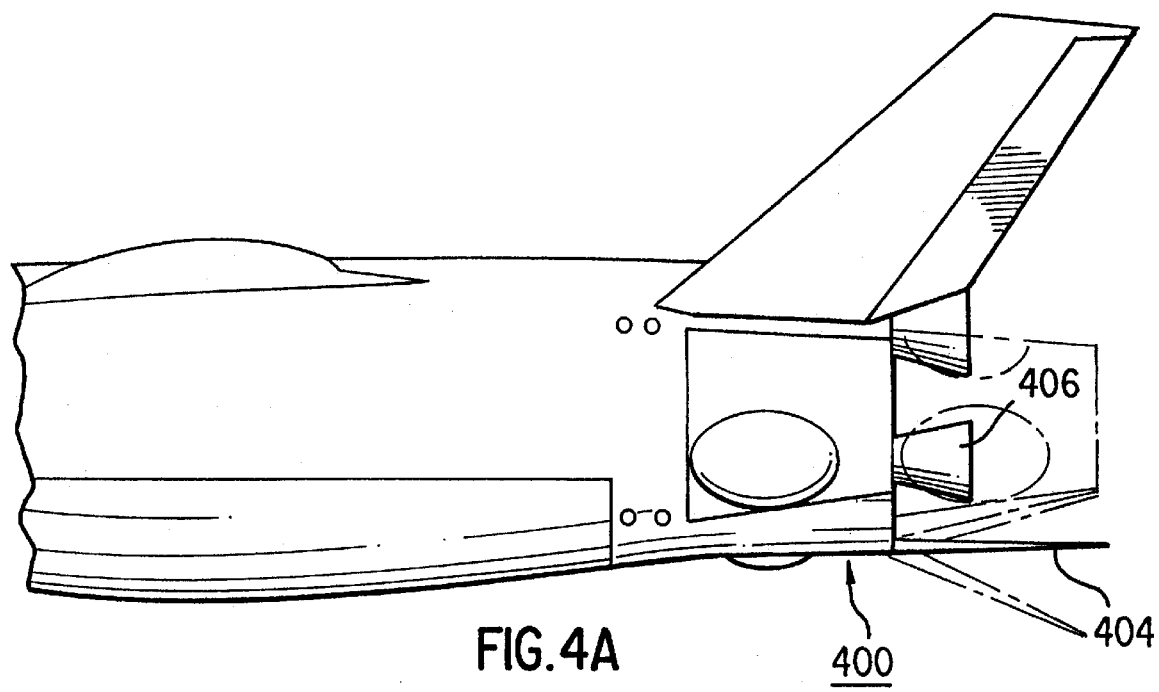
FIG. 4 shows a detail of the aerodynamic aft section embodiment of the present invention with two speed brakes and a body flap.
Figure 4B:
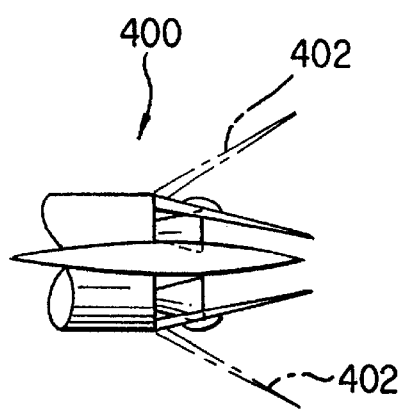

A solution for this problem, as is shown in FIG. 4, is to provide three deployable aerodynamic control surfaces mounted to the exterior of the aft section 400 of the StarBooster 350: two Speed Brakes 402 and one Body Flap 404. This constitutes the Intelligent Aft Section. Immediately after separation from its payload, the four rocket thrust chambers of the RD-173 engine 406 are gimballed inboard and toward the vehicle centerline. Each of these three aerodynamic surfaces then extends aft on internal tracks to a hinge position near the aft end of the fuselage. Rotary electo-mechanical actuators will then permit single degree-of-freedom rotation of each of the three surfaces in response to commands from the vehicle's central computer, increasing aerodynamic control authority.

For hypersonic flight, rapid and controlled deceleration during a post-separation "zoom" climb may dictate that the speed brake surfaces be positioned laterally outboard, with directional control aided by their differential positioning. Similarly, the body flap attitude, in its extended position, will be modulated to provide pitch control and may aid in increasing drag during that portion of the flight for which this feature is useful.

Once the vehicle has completed its turn toward the launch site and has reached subsonic speed, the Speed Brakes perform a different function—that of drag reduction, by moving them inboard to just clear the rocket engine exhaust nozzles, providing a semi-faired "boattail". Dividing each Speed Brake into two individually controllable sections to permit further fairing may prove to be desirable.

For landing, it may be necessary to retract these surfaces to avoid ground contact. Detailed analyses will be required to reach the proper balance of simultaneously maintaining aerodynamic control and providing safe ground clearance.

StarBooster and Atlas III

Another opportunity for application of the StarBooster concept arose when the Lockheed Martin Corporation, in cooperation with Pratt & Whitney Division of United Technologies Corporation, made decisions to bring into being the RD-180 rocket engine and the Atlas III space launch vehicle through company-funded programs. The RD-180 is a two-chamber derivative of the RD-170 four-barrel engine and the Atlas III vehicle is a 10 ft. diameter evolution of the proven Atlas space launch vehicle family. The RD-180 engine produces 860,400 lbf thrust at sea level, at a vacuum specific impulse of 337.8 sec., and the Atlas III first stage houses 404,000 lbm of oxygen/kerosene propellants, thus delivering about 58% of the total vacuum impulse of its larger Zenit relative.

The Atlas III Expendable Launch Vehicle

Lockheed Martin is developing this space launch vehicle commercially as the latest member of its highly successful Atlas family. Delivery of the first flight article occurred in early March 1999. It uses 10 ft. diameter, thin-walled stainless steel propellant tanks, stabilized by internal pressure, in order to minimize dry weight, a practice dating back over 40 years to the Atlas ICBM and successfully flown over 500 times.

Stage length is 94.8 ft., establishing the length of the body cavity in Starbooster. Lockheed Martin did not state dry weight of this stage, but the weight of the RD-180 engine is known, and many other elements may be closely estimated. Dry weight is, for the purposes of the analyses to be described below, estimated to be near 26,500 lbm, an impressive accomplishment, resulting in a propellant mass fraction in excess of 0.93. With its upgraded, single RL10 engine Centaur upper stage, the Atlas III can place payloads of 8,900 lbm to the geo-stationary transfer orbit (GTO).

Although the Atlas has proven to be highly successful for over 500 missions, there are perennial objections to its use of pressure stabilization, as loss of pressure may be accompanied by structural collapse; of particular concern for a compete, untanked vehicle resting on the launch pad with its expensive payload. The Lockheed Martin vehicle for the U.S. Air Force EELV program will use larger, thicker walled aluminum tanks, capable of free-standing without pressurization in the face of high winds at the launch pad. This security, however, comes at the price of increased inert mass and the necessity of adding propellant capacity, serious design compromises.

The traditional means of overcoming this potential problem for ground handling of Atlas and Centaur has been to use a "stretch fixture" to place the tank side walls in tension.

Incorporation of this stage in StarBooster 200 will remove this concern, as fore and aft attachment of the stage to the airplane can establish a tension load on the side walls which is relieved with pressurization, but is available at all times, including in flight.

StarBooster/Atlas III Configurations

Three variants of Starbooster have been conceptually defined to date for making fully reusable the now expendable first stage of the Atlas III. These are StarBooster 200, hosting a single Atlas III first stage, Starbooster 400, a larger aircraft hosting two of these stages, and StarBooster 600, larger still, and housing three of the same stages.

StarBooster 200, which is shown in FIG. 3, is the first which is planned to be built, serving as a demonstrator test vehicle for the larger versions, and entering commercial service after testing as a fully reusable space booster. Early operations of this vehicle are expected to establish development and acquisition costs, manpower intensity (critical to cost-per-flight), turn-around time, and flight reliability of the overall Starbooster family.

In particular, extensive commercial use of StarBooster 200 is expected to confirm the cost-effectiveness of the concept and to gain, through actual operational flights, a significant body of demonstrated reliability, parts consumption, turn-around time, life and to identify highly desirable design refinements for the larger and more expensive follow-on vehicles.

In FIG. 5, the StarBooster 200 embodiment of the present invention 500 houses a Atlas III first stage 502 as its rocket propulsion module. StarBooster 500 has a nose section 504 with canards 506, a delta wing section 508 containing fuel tanks 510 for use with air breathing engine pod 512. It this embodiment of the StarBooster the air breathing engines are located in two pods on top of the fuselage over the wings.

The question will arise as to what dry weight penalty is consequent to building an aircraft to house a existing rocket stage rather than the more conventional approach of using integral tanks, which were used in both NASA in-house and industry studies.

To answer this question, a brief analysis was performed which indicates that this penalty, for the single Atlas III/StarBooster 200, is less than 5,000 lbm, or about 8%. As the booster stages well below orbital velocity, this will reduce orbital payload by only a small percentage considered an acceptable penalty for the benefits gained.

StarBooster 200

This automated (no human pilot aboard) vehicle, illustrated by FIG. 5, is now envisioned as a delta plan form aircraft with a wingspan of 60 ft., overall length of 132 ft., and height on its landing gear of 19.5 ft. Deployable canard surfaces are provided to reconcile the disparate control requirements of hypersonic flight and efficient subsonic cruise. Empty weight of the aircraft alone is now estimated to be near 70,000 lbm. Two JT8-D turbofan engines are mounted above the body and 17,200 lbm of jet fuel are provided to support 1½ hours of flight at full power for return from the maximum down-range distance to the launch site for landing, with 30 minutes reserves. In addition. 1,400 lbm is allowed for the reaction control system (RCS) propellant and coolant expended during hypersonic/supersonic flight and entry. During rocket powered ascent flight, the gimballed rocket engine provides three axis control.

The StarBooster series are not intended to achieve orbit—that is the function of the additional, smaller rocket stages carried beneath its body, along with orbital payloads such as communications satellites. StarBooster will deliver these payload ensembles to a sub-orbital staging velocity and altitude which will multiply their capabilities relative to the capability of the rocket stages if they are ground launched.

Maximum lift-off mass of 688,300 lbm for StarBooster 200 plus its upper stages and payload, will provide a liftoff thrust-to-mass ratio of 1.25:1 in "series burn" (no supplemental thrust for liftoff from payload rocket stages). Payload for this application will be up to 184,000 lbm to an ideal velocity of about 9,500 ft/sec, a staging velocity (BECO, or booster engine cutoff) near Mach 5, well within the Mach 6 "heat sink" limits of its aluminum airframe.

More massive payloads can be accommodated by off-loading a portion of the propellant from StarBoosterI, producing lower but still useful staging velocities, or by "parallel burn" in which the payload stage contributes to liftoff thrust.

In a similar manner, payloads less massive, that would normally result in staging velocities above the Mach 6 "heat sink" limit of StarBooster, may be accommodated by trajectory shaping to reduce heating loads and/or by off-loading StarBooster propellant.

StarBooster 200 Applications

Numerous applications of this vehicle are anticipated, including both single and multi-stage rocket vehicles and hypersonic air-breathing propulsion vehicles.

For example, flight of the Lockheed Martin Athena II three stage solid rocket vehicle with StarBooster 200 will deliver 13,000 lbm of payload to low Earth orbit (LEO), almost three times the 4,390 lbm payload to LEO available when Athena II is ground-launched, and half again more than that of Athena III, a larger Lockheed Martin vehicle.

Figure 6:
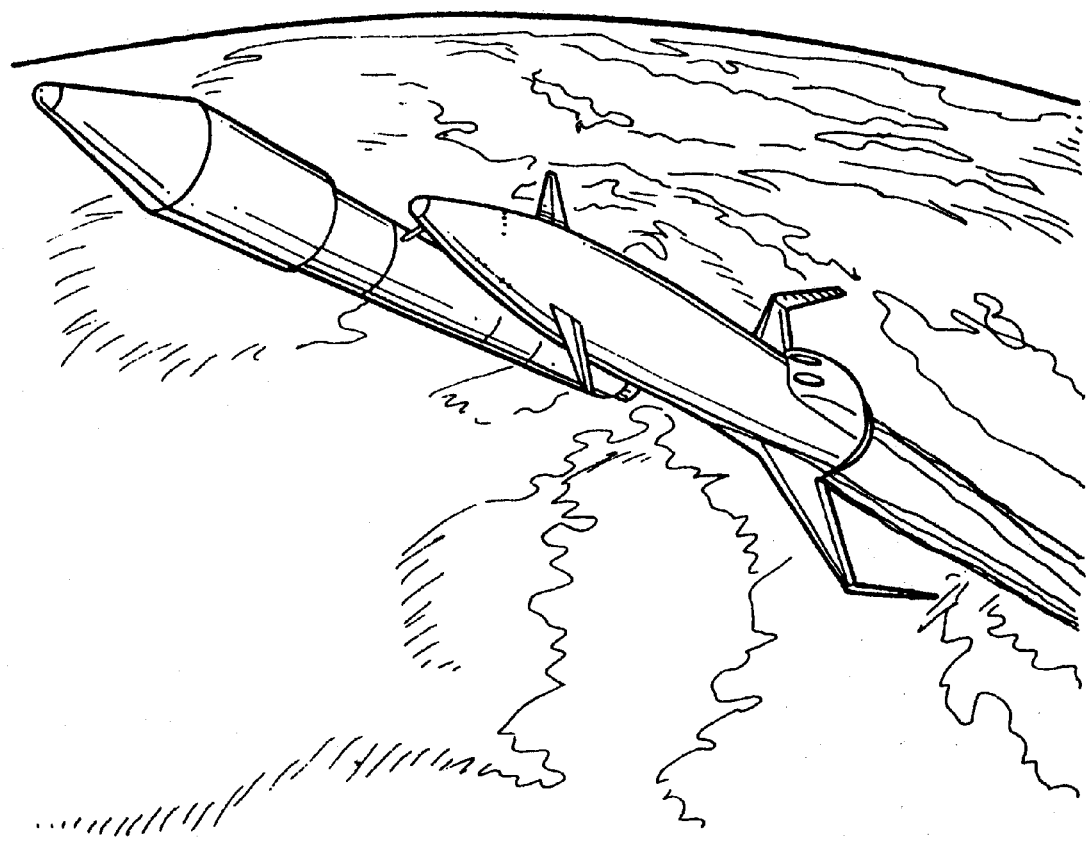
FIG. 6 shows the StarBooster 200 launching an Athena II as an upper stage.

FIG. 6 shows a StarBooster 200 fully recoverable booster launching a Lockheed Martin Athena II launch vehicle as the upper stage of a multistage space launch vehicle.

Figure 7:
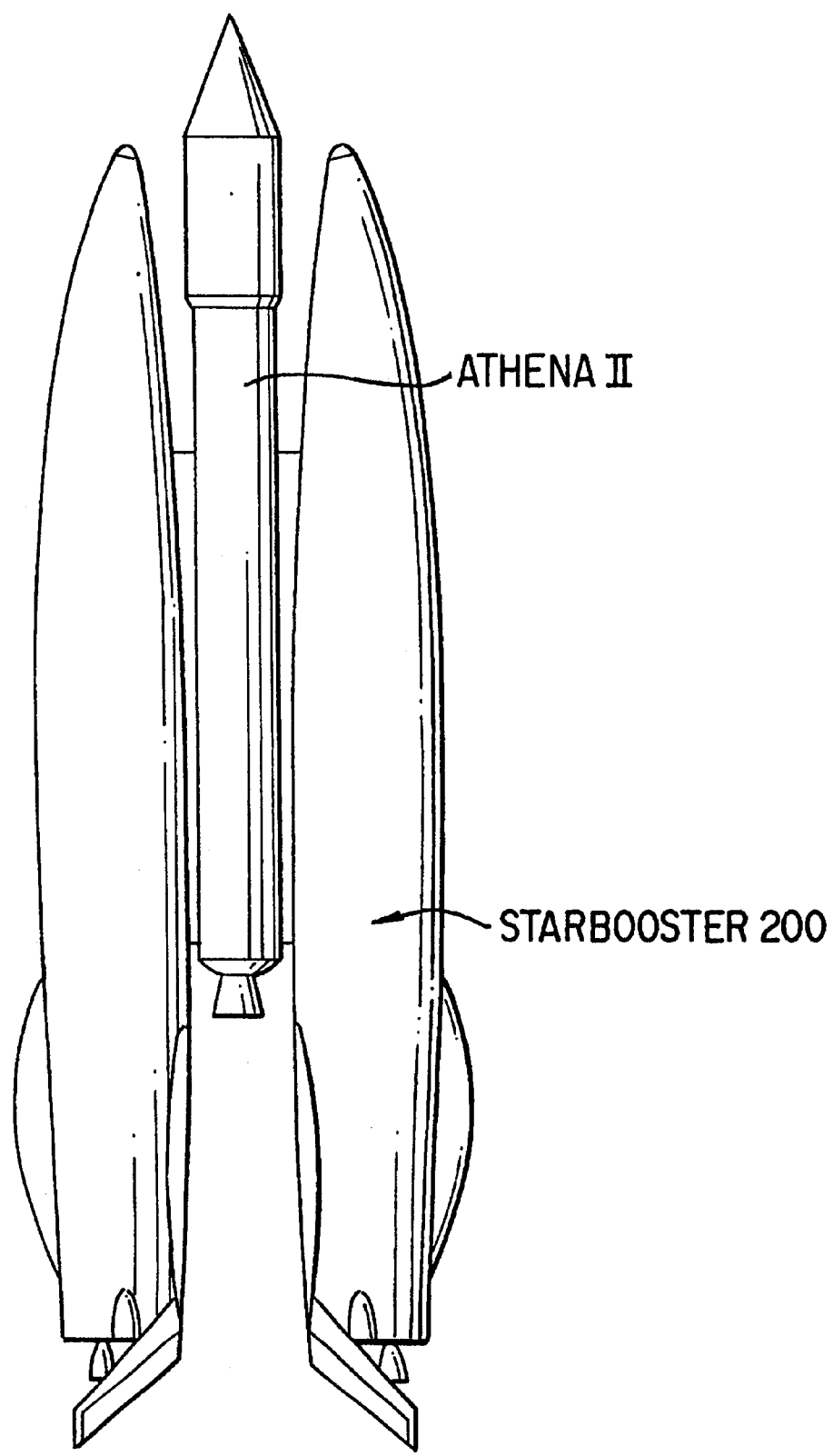
FIG. 7 shows dual StarBooster 200s mated to an Athena II as an upper stage.

FIG. 7 shows a pair of StarBooster 200s mated to a Lockheed Martin Athena II launch vehicle as an upper stage to provide a multistage space launchvehicle. This embodiment of the present invention is capable of launching 10.6 metric tons to low Earth orbit (LEO).

Due to the boost given by dual StarBooster 200s, the Athena II gains an entirely new capability: launch of payloads to the geo-stationed transfer orbit (GTO) favored by communications satellites. By using the Star 75 solid rocket motor as an upper stage, it can place almost 4 metric tons in geotransfer orbit (GTO). 8331 lbm of satellite and apogee kick stage are delivered to this high energy orbit by the StarBooster 200/Athena II embodiment of the present invention, which puts it in the same payload class as the Boeing Delta III launch vehicle.

Figure 8:
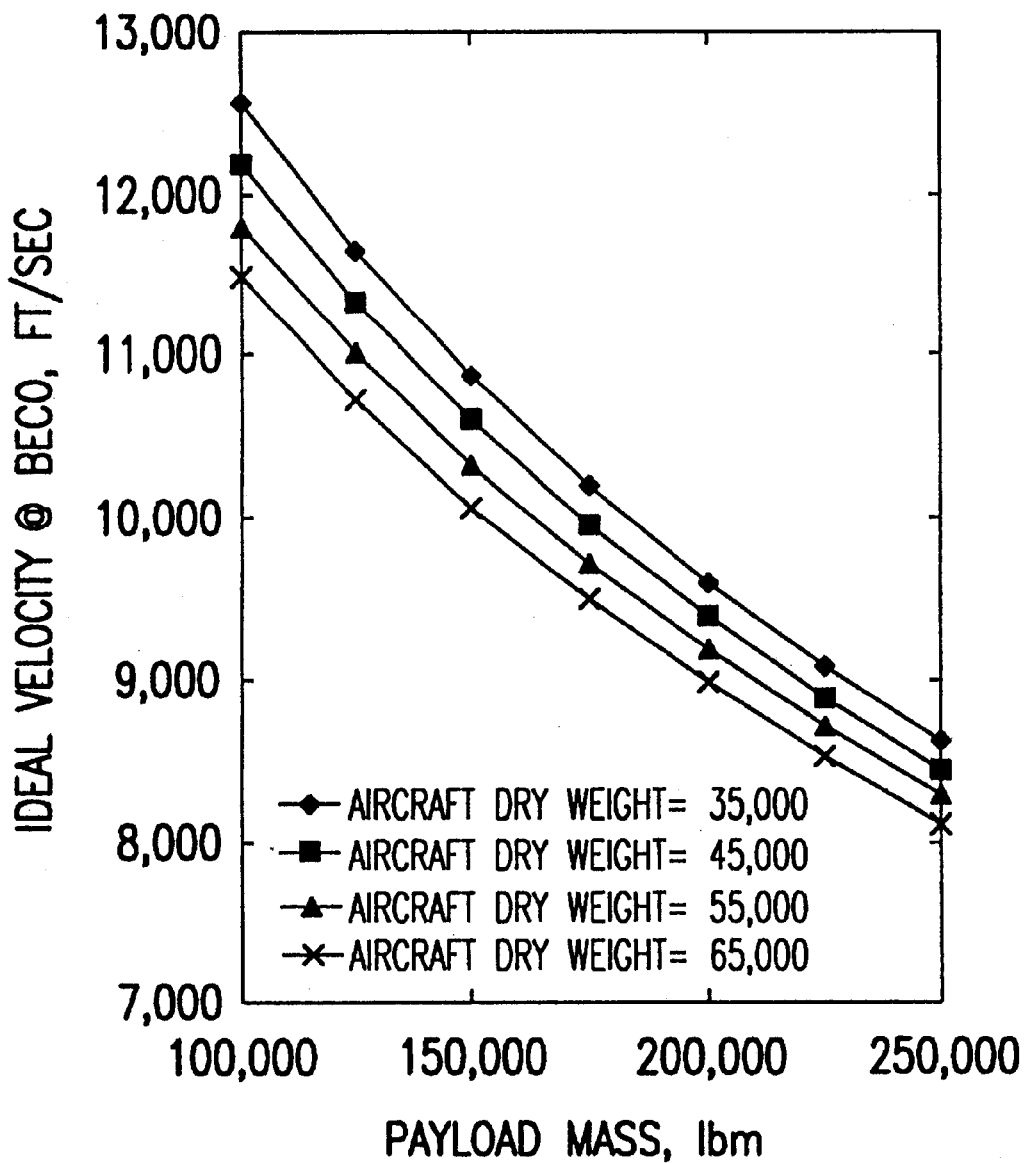
FIG. 8 is a graph illustrating the parametric boost performance of the present invention comprising the StarBooster 200 using a single Atlas III first stage as its rocket propulsion module.

FIG. 8 illustrates the parametric boost performance of StarBooster 200. Note that this entire range of payload, ideal velocity combinations may not be useable because of either liftoff mass or staging velocity limitations. A maximum payload mass of 185.000 lbm is thus indicated; more if propellant is off loaded from the Atlas III or if the payload contributes additional lift off thrust by a parallel burn. What is clearly shown by the figure is the insensitivity of performance to aircraft dry weight.

By using a pair of StarBooster 200s as a first flyback booster stage as was shown in FIG. 7, payload performance for launch missions is almost doubled for many potential upper stage combinations. This permits launch of payload ensembles of up to 368,000 lbm (more with propellant off-loading) with "series burn", including the Atlas I and II, the Ukrainian IKAR II, the Russian Rokot, Start, and Tsyklon vehicles derived from surplus Soviet era ICBMs, the Ariane 5 (less its solid rocket boosters), and others.

This versatility is facilitated by the StarBooster "dual keel" construction, which provides both stiffness to the body and permits multiple attachment points for payloads at various longitudinal fuselage stations, a necessity for payloads of different lengths and masses.

StarBooster 200 may also be used in the "parallel burn" mode, in which the first rocket stage of the payload is ignited on the launch pad, nearly simultaneous with ignition of the RD-180 engine. A candidate payload for this mode may be the new Delta IV vehicle, the Boeing offering to the U.S. Air Force for the Enhanced Expendable Launch Vehicle (EELV) program or an additional Atlas III two stage (or the closely related Lockheed Martin EELV, Atlas V, ) flown as expendable vehicles. Either one or two StarBooster 200s might be used to enhance the performance of these "parallel burn" vehicles to avoid expending additional stages, as is now planned for growth versions of the EELV.

StarBooster 200 as an Upper Stage

When the larger StarBooster 400 and/or 600 vehicles are brought into service, it may prove advantageous to fit the StarBooster 200 vehicle with a modest thermal protection system to permit safely reaching higher Mach number stage points and to add provisions for nose mounting of payloads, rather than retiring them. These modifications may permit Starbooster 200 to fly on its larger siblings thus permitting the first two stages of many launch vehicle combinations to be fully reusable. This measure will therefore extend the useful life of Starbooster I , the first members of the StarBooster family. An illustration of the performance of the StarBooster 200+600 vehicles is be described below.

StarBooster 400

This vehicle carries two Atlas III first stages in a "double-barreled" fuselage, with a larger wing, vertical fins, and canard surfaces. An initial estimate of dry mass of this aircraft is 100,000 lbm. With 1% flight performance reserves, 34,500 lbm of turbofan engine fuel and 2,800 lbm of RCS propellant and coolant, the inert mass at staging is estimated to be near 200,000 lbm; landing weight is much less due to venting of excess propellants and coolant after burnout and separation from the payload.

Figure 9:
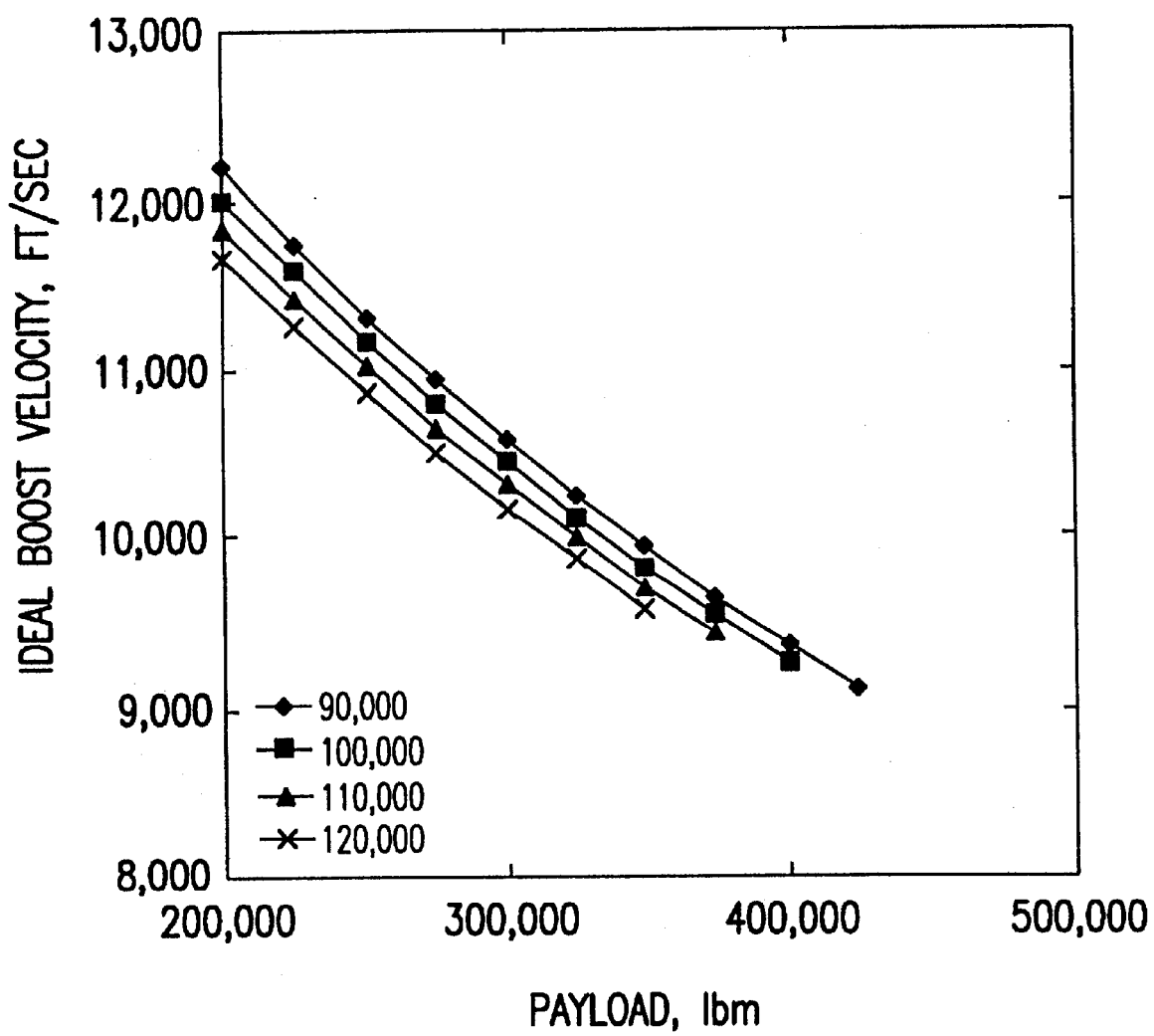
FIG. 9 is a chart showing the parametric performance of the Starbooster 400 embodiment of the present invention using two Atlas III first stages as its rocket propulsion module for a range of aircraft dry mass from 90,000 to 120,000 lbm. This chart vividly illustrates the relative insensitivity of payload to the dry mass of the flyback booster airplane.

FIG. 9 shows the parametric performance of this vehicle for a range of aircraft dry mass from 90,000 to 120,000 lbm. Once again, this chart vividly illustrates the relative insensitivity of payload to dry mass. Care must be taken for payloads near the left side of this chart to provide a thrust-to-mass ratio of 1.25 or above, resulting in a maximum gross liftoff mass of 1.38 million lbm, with a maximum payload mass for "series burn", without offloading propellant, of 369,000 lbm. Additionally, on the right side of the chart, payload mass must be sufficient to assure that StarBooster 400 does not exceed the Mach 6 staging velocity limit consequent to use of the aluminum structure as a "heat sink" thermal protection system (TPS).

"Parallel bum" and dual booster options are available with the StarBooster 400 vehicle as was the case for StarBooster 200, which will further broaden its applicability to space launch missions.

StarBooster 600

Three Atlas III first stages are housed in the StarBooster 600 aircraft, two side-by-side with one centered above this pair, producing a fuselage width of about 22 feet. Wing, tail, and canard areas are increased to maintain the flight characteristics, including airliner-like landing speeds. Total propellant quantity is 1.21 million lbm and total impulse is 410 million lbf-sec., almost 40% greater than that produced by the NASA RSRB for the Space Shuttle, currently the world's most powerful booster. Inert mass of StarBooster III at BECO is expected to be near 265,000 lbm, with a lower landing weight due to the venting of excess fluids after separation from its payload It is clear that a fully reusable liquid propellant booster of this great power will enable space ventures far beyond those permitted by present systems, including human exploration of Mars, placement of Space Solar Power Satellites, and establishment of a Lunar Base. Commercial uses of space may well have matured by the time of its introduction to fully utilize the services of a fleet of such vehicles.

Use of multiple StarBooster 600 vehicles with a large new cryogenic propellant upper stage, powered by either Space Shuttle Main Engines (SSMEs) or the similar FSU RD-0120 engine can deliver very large payloads to LEO.

StarBooster 600 Applications

Studies of the numerous prospective applications of StarBooster 600 have just begun. One application may be to use as payload the modified StarBooster 200 vehicle described earlier, with the orbital payload or the Military Space Plane mounted on its nose.

Figure 10:
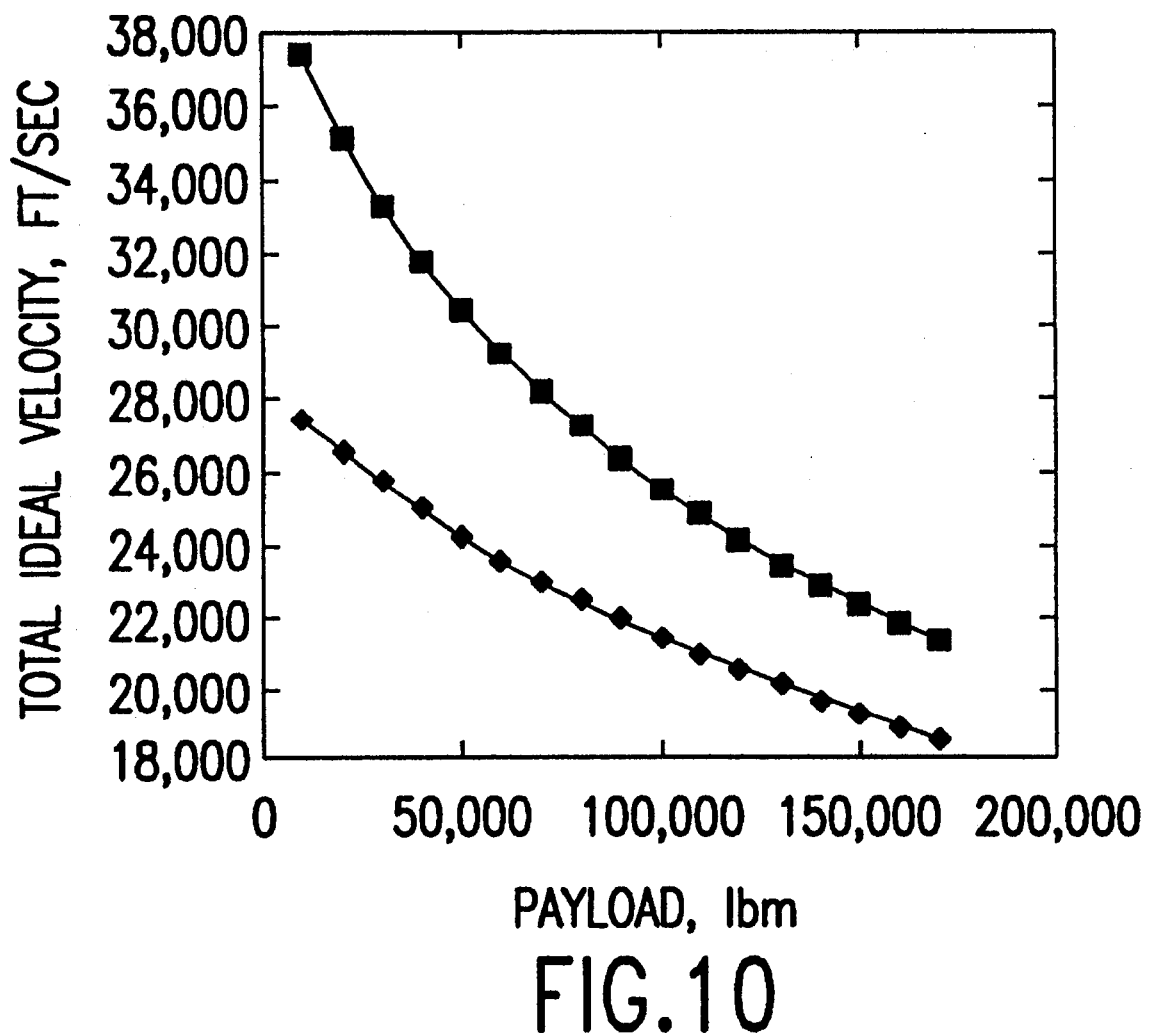
FIG. 10 shows the parametric performance of the StarBooster 600 embodiment of the present invention using three Atlas III first stages as its rocket propulsion module with a modified StarBooster 200 as a reuseable second stage and with an additional copy of the Atlas III as an expendable second stage.

Another application may be to use an additional copy of the Atlas III as an expendable second stage for StarBooster 600. Parametric performance of these two options is displayed in FIG. 10. Note that the expendable Atlas III first stage, due to its exceptionally low dry weight, provides orbital capability of near 50,000 lbm for this all kerosene fuel vehicle, reduced by the effective mass of the payload fairing and instrument unit required to control the Atlas III during its independent flight. Net payload delivered to LEO is expected to exceed 40,000 lbm, at or near that of the much more expensive Titan IV now used for such missions.

When fitted with an expendable cryogenic upper stage similar to today's Centaur, net payload of the StarBooster 600/StarBooster 200 combination is expected to be 42,000 lbm to LEO, over 19,000 lbm to GTO, 15,000 lbm to Earth escape, and 9,900 lbm to geostationary orbit (GEO). Propellant mass for this stage is between 35,500 and 65,000 lbm, in the range of the several variants of Centaur which have been produced or proposed.

One of the more significant applications of follow on versions of StarBooster vehicles may be to replace the Revised Solid rocket Boosters (RSRBs) of the NASA Space Shuttle vehicles.

StarBooster 200 could serve as an effective demonstrator for the NASA LFBB, irrespective of the final configuration and supplier of a LFBB for the Space Shuttle. As compared with the much smaller demonstrator vehicles that have been suggested, StarBooster 200 will provide data on a vehicle of a quarter through half full size to generate relevant authoritative data on manpower utilization, turnaround time, life, and the other critical parameters.

StarBooster 200 will add to this body of experience by operations as a commercial booster. Furthermore, its RD-180 engine is a serious contender for the NASA LFBB role.

StarBooster 600, with its three RD-180 rocket engines, may be a strong contender for the final selection of a LFBB, as it offers a significant increase in both flight safety and performance compared to the systems now in use. Larger versions of StarBooster may also be provided if needed.

The ability of the StarBooster 600 to detect and, if necessary, shutdown one of its three engines per booster during ascent adds an important capability to avoid disaster, compared to the RSRBs which, once ignited on the launch pad, will continue to burn until propellant exhaustion, without regard for subsequent events. Potential interference of the Starbooster 600 and Orbiter wings will require off-center mounting on the ET and/or awing fold mechanisms.

Figure 11:
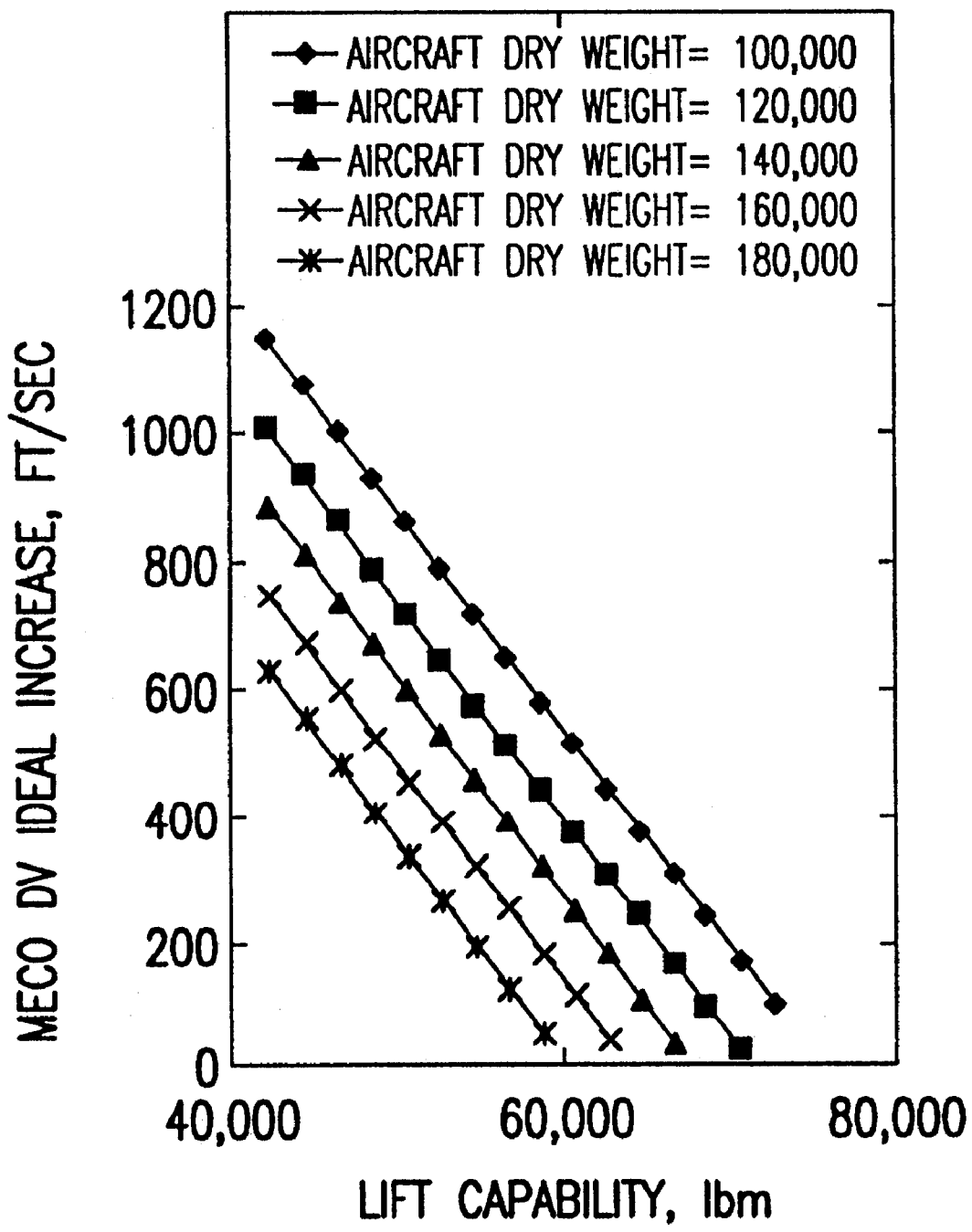
FIG. 11 shows the impact of the replacement of the current Shuttle solid rocket boosters with dual StarBooster 600s upon payload delivered on the first International Space Station (ISS) deployment mission, STS 088.

Preliminary performance of StarBooster 600 used in pairs with the current Space Shuttle Orbiter and External Tank (ET) as replacements for the current RSRBs is indicated by FIG. 11. As StarBooster 600 presents more frontal area than does the RSRB, additional velocity losses will be experienced during ascent flight. FIG. 11 shows the impact upon payload delivered on the first International Space Station (ISS) deployment mission, STS 088, of these losses and of the present uncertainty in the aircraft dry weight, now expected to be in the vicinity of 140,000 lbm,.

The Space Shuttle "lift capability" reported by NASA on Jun. 17, 1997 for the STS 088 mission was 32,526 lbm to the ISS, with a mass at SSME burnout of 326,236 lbm, including the Orbiter, its fluids, crew, equipment, etc., and the spent ET. Lift capability is defined by NASA as the net payload delivered plus a small manager's reserve.

Current expectations are that, with two StarBooster 600s used in place of the RSRBs, this performance will almost double—to a "lift capability" of 60,500 lbm. If the StarBooster III airplane dry mass is almost 30% greater than now expected, and trajectory losses double present expectations, lift capability remains above 45,000 lbm, thus assuring a large performance increase for the Space Shuttle as well as the improved safety of multi-engine liquid propellant boosters which can shut down a malfunctioning engine.

Abort mission capabilities in the face of an engine failure have not yet been analyzed. The fact that propellant will be trapped in a malfunctioning Atlas III stage after engine shutdown makes its capabilities less than that of an integral tank LFBB. If future analyses indicate the necessity, the three Atlas III propellant feed systems might be manifolded upstream of the engine interfaces to eliminate this shortcoming. As these interconnections will come at the price of increased maintenance requirements, higher parts count (meaning lower reliability), and increased turn-around time, it is not yet evident that net benefits will result from this change.

StarBooster with Atlas III. Athena and Titan IV

Atlas III

Reusability of space launch vehicles is the single most important future development to decrease the high cost of access to space, permitting increasing confidence in the vehicle through repeated use while reducing costs by not discarding expensive hardware after less than three minutes of operation. The best place to begin obtaining these new economies is by returning for reuse the largest element of a space launch vehicle: the booster stage.

StarBooster is an innovative means of accomplishing this goal at an affordable price; by de-coupling, to the extent possible, development and operation of the rocket needed for vertical ascent from the aircraft. After completion of rocket powered ascent and payload separation, the unmanned, jet powered aircraft, including the now empty rocket, returns to the launch site for reuse, first gliding and later flying under turbine engine power back to a normal aircraft landing on wheels.

StarBooster is an aluminum aircraft, capable of many repeated rocket-powered ascents to 50 kilometers altitude at up to Mach 6, followed by safe entry and subsonic powered flight to return to base, and may be prepared for re-flight without requiring significant maintenance or down time.

The airplane is constructed primarily of aluminum, with skin thickness adjusted as needed to provide a low maintenance "heat sink" thermal protection system. Leading edges and the vehicle nose will require the use of materials capable of tolerating higher temperatures. Thus, there are no tiles, blankets, or other fragile materials on the vehicle's exterior. It is a delta planform aircraft which comes into action after separation of the rocket stages and payloads carried by StarBooster, performing a "zoom climb" to dissipate down-range velocity and a supersonic turn to a heading for return to the launch site. When altitude less than 8 kilometers and subsonic flight velocity conditions are attained, the turbofan engines air-start and subsonic cruise begins for the return flight from about 500 kilometers downrange.

Figure 12:
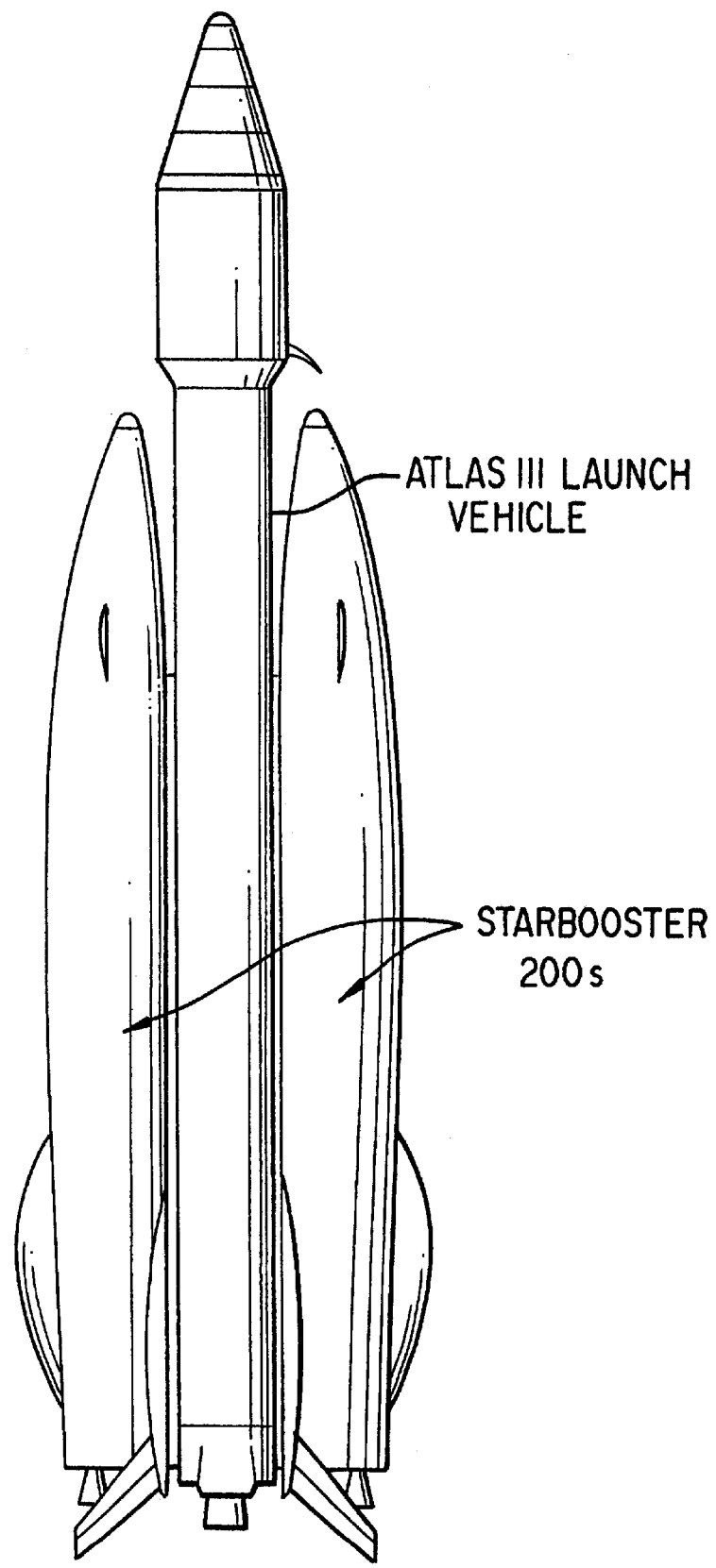
FIG. 12 shows a multistage launch vehicle taught by the present invention comprising an Atlas III upper stage with a pair of StarBooster 200 as fully reusable liquid propellant first stage boosters, configured for series burn.

FIG. 12 shows a pair of StarBooster 200 fully reusable boosters mated to an Atlas III expendable launch vehicle. This embodiment of the present invention allows delivery to the geo-stationary circular orbit (GEO) the same payload which is now deliverable only to the lower energy geo-transfer orbit (GTO), effectively doubling the payload capability of this already capable space launch vehicle and eliminating the cost of an "apogee kick motor" (AKM).

StarBooster 200 uses a reusable rocket propulsion module housing about 200 short tons (400,000 pounds) of oxygen/kerosene propellants and is powered by one RD-180 "double barrel" rocket engine originated in Russia and now licensed by Pratt & Whitney. The RD-180 engines will producing more than 1.8 GN (400,000 pounds) of thrust at sea level. This engine is relatively mature technology, as they are derived from the existing RD-170 engine that powered Energia and Buran boosters and is now used for the first stage of the Zenit expendable launch vehicle.

As the rocket propulsion module is designed to be readily removable, inspection of the rocket and airplane components of StarBooster may be carried out in parallel. If either requires extended maintenance, an additional aircraft or rocket may be used for the next mission while rapidly returning the other element to service.

Many applications (payloads) are foreseen for this powerful booster, including multiplying the payload capability of the relatively economic vehicles derived from ICBM technology: consisting of three or four solid rocket motors (SRMs). Athena, Taurus, the Japanese M-V, or a new, optimized three-stage system are all candidates for enhancement through boost by one or a pair of StarBoosters.

On some missions, the "payload" first stage will be ignited and burn at reduced power level through boost. This is termed "parallel burn". On other missions, including those using solid rocket motors, the "payload" stage will not be ignited until post-boost separation from StarBooster; "series burn". For some missions, StarBooster tanks will not quite be filled, in order to achieve the desired liftoff thrust-to-weight ratio.

Many other existing or new launch vehicles can also benefit from the boost provided by StarBooster(s), including the Titan IV core, the Japanese all-cryogenic propellants H-2, the Russian IKAR 3 (formerly known as the SS-18 ICBM, and are available in quantity), and either of the new USAF Evolved Expendable Launch Vehicles (EELVs), the all-cryogenic propellants Delta IV or the Lockheed Martin EELV entry based upon their Atlas III.

Other uses of StarBooster may include upgrading the "air drop" deployment of X-Plane vehicles from subsonic, 10 km altitude drops available today from B-52 and Lockheed L-1011 aircraft, to the Mach 6, 50 kilometer altitude release provided by StarBooster. This can include providing the X-33 assurance of reaching Mach 15.

Another near-term use will be to act as a dedicated technology development and demonstration vehicle for NASA's planned Liquid Flyback Booster (LFBB) for the Space Shuttle. StarBooster 200 is an ideal size to gather dependable data on components, software, subsystems and vehicle flight operations, inspection and re-certification requirements, turn-around time, crew size, etc. for the larger LFBB.

Numerous military applications may also be anticipated, possibly including simplification of the design and construction of advanced air-breathing vehicles, including the supersonic combustion ramjet (Scramjet).

The principal benefit to be gained by the development and deployment of StarBooster is, however, not confined to any or even all of these attractive applications. The experience and confidence to be gained by frequent and profitable commercial operation of the fully reusable StarBooster 200 will initiate the age of reusable commercial space launch services—a true paradigm shift in access to space. This will lead to larger derivative vehicles capable of providing services for applications under consideration. These include human expeditions to Mars, deployment of gigantic Space Solar Power satellites, global space defense, possibly space tourism and rapid delivery services, and many other new uses which the more economical launch services of Star-Booster will inspire.

Atlas III with StarBooster 200

An analysis of the effect upon performance of the Atlas III using StarBoosters for boost assist was conducted to quantify the prospective performance by augmenting Atlas III with a pair of the fully reusable liquid propellant boosters, StarBooster 200, in series burn.

StarBooster 200, a fully reusable space, carrying one Atlas III first stage, was examined as a "demonstrator" vehicle for the NASA LFBB and as a means of enhancing performance of existing expendable launch vehicles, including the Lockheed Martin Athena.

First, a check of liftoff thrust-to-mass ratio indicated that an unsatisfactory ratio of 1.1:1 or less exists by "series burn" of the dual StarBooster 200/Atlas III "stack". Off loading of StarBooster 200 propellants will thus be necessary to achieve a minimum of 1.20:1.

Figure 13:
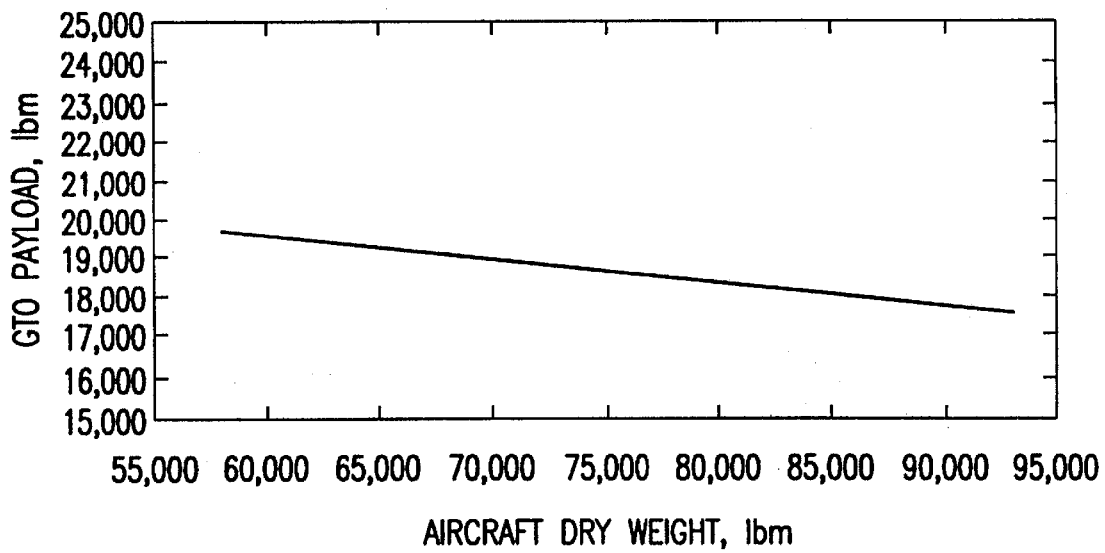
FIG. 13 is a chart showing the StarBooster 200 Airplane Dry Mass vs. Atlas III GTO Performance for the embodiment of the present invention shown in FIG. 12. Note that GTO performance is not seriously impaired by a major increase in aircraft dry mass, illustrating the robustness of the present invention.
Figure 14:
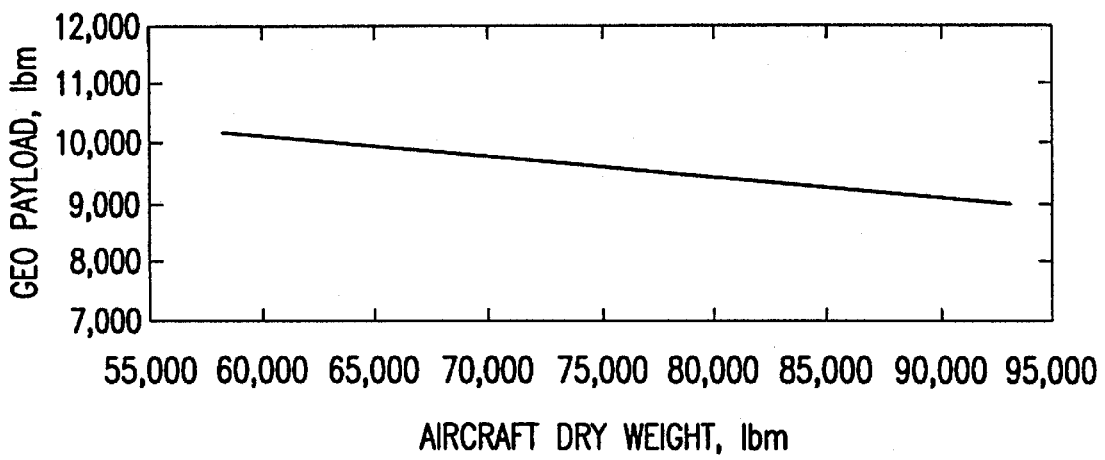
FIG. 14 is a chart showing the StarBooster 200 Airplane Dry Mass vs. Atlas III Geo-Stationary Circular Orbit Payload Delivery Performance for the embodiment of the present invention shown in FIG. 13. This performance is well above present needs, indicating a new capability to launch future communications satellites.

Preliminary results of this performance analysis are shown in FIGS. 13 and 14. FIG. 13 shows performance results to GTO and displays the low sensitivity of payload delivered to aircraft dry weight, is characteristic of multi-staged systems. At the StarBooster 200 nominal aircraft dry weight of 34 metric tons, 8.5 tons of payload may be delivered to GTO, an increase of 110% beyond that of the unaided Atlas III. Over the range of aircraft dry weights examined, 26 to 42 tons, GTO payload varies from 8.9 to 8.0 tons, a sensitivity of only 5.6%. For this analysis, Star-Booster 200 propellants were off loaded to observe a minimum lift-off thrust-to-mass ratio of 1.20:1. Also, an increase in mission ideal velocity beyond that of the baseline Atlas III of 122 m/sec. was assumed for this analysis to account for the increased gravity and drag losses expected to occur with use of these boosters.

This doubling of Atlas III payload capability through the use of StarBoosters for boost assist is usable if structural limitations of the Centaur stage can become adequate.

In the Titan IV case, the Centaur third stage structure limits the payload to geo-stationary circular orbit (GEO) to 90% of the Titan IV performance capability; 5.2 metric tons. The Atlas III structural limit may thus be close to its 4.1 ton GTO payload capability. If this is true, the excess performance capability consequent to use of fully reusable Star-Booster 200s with Atlas III might better be used to increase the final velocity of the payload sufficient to place it in geo-stationary circular orbit (GEO) rather than to the elliptical transfer orbit.

To accomplish this mission, the issue of propellant boil-off during the four and one-half hour coast to geo-stationary altitude will have to be addressed. This issue has been reviewed in previous works and mitigating measures defined. The Centaur has in fact flown missions with coast intervals of this magnitude between burns. FIG. 14 addresses the performance of the Atlas III as presently configured to GEO circular orbit when aided by a pair of StarBooster 200 vehicles. At nominal aircraft dry weight, almost 4.4 tons of payload may be delivered to GEO—8% more than the GTO performance of the unaided Atlas III. Sensitivity of payload to aircraft mass is now only 3.3%, varying from 4.6 tons down to 4.1 tons over the +/−20% range of aircraft weights examined. This payload is 84% that of the Titan IV-B at far less cost.

The increase in payload capability available by replacing the present RL10 engine of Centaur with the later, higher performance RL10B-2 was estimated to be near 300 kilograms—not sufficient to achieve EELV-H requirements. The next step in upgrading performance of the Atlas III/StarBooster 200 combination may be to increase the propellant capacity of the Centaur stage. If the Centaur propellant capacity is increased to 27 tons, GEO payload capability may approach 8 tons, a comfortable margin above both the present Titan IV capability and the EELV-H performance required. With this margin, recovery from GEO and re-use of the Centaur stage may be examined to further reduce heavy lift launch costs.

Upgrades to the Centaur stage may also be anticipated for future use of the Atlas III/StarBooster 200 launch vehicle with the NASA Langley Research Center HL-20 to serve as a supplement to the Space Shuttle for re-supply and personnel transport to and from the International Space Station. This upgrade may include use of the RL10B-2 engines, oxygen tank(s) internal to the HL-20, and external hydrogen tanks.

StarBooster 200 as a part of the Atlas III system now appears to offer a large increase in performance, large reductions in heavy launch costs, and increased safety.

Industrial Applicability

The present invention is capable of exploitation in the satellite launch services and space launch industry. One example of how it can serve this industry is in combination with the StarCore I Expendable Upper Stage Assembly (an upper stage optimized for the StarBooster using stages from the Lockheed Martin Athena and Centaur launch vehicles.) Another example of the way in which the invention is capable of exploitation in the space launch services industry is shown below in connection with the use of dual Star-Booster 200s to improve the performance of the Titan IV space launch vehicle.

The StarCore I Expendable Upper Stage

The Problem

The StarBooster 200 vehicle requires one or more upper stages of rocket vehicles to complete the placement into orbit of various payloads. The upper stage/payload assembly is carried by either one or two StarBooster 200 reusable boosters from the launch pad on Earth to a flight velocity between Mach 3 and Mach 6, near 150,000 feet altitude. These boosters separate from the upper stage/payload assembly shortly after booster propellant exhaustion, safely decelerate from the separation velocity, perform a supersonic turn to a heading toward the launch base, decelerate to subsonic velocity, ignite their turbine engines, perform subsonic cruise to the landing pattern, and land on a runway near the launch pad. The upper stage(s)expend their total impulse to place the payload into the proper orbit, which may be low Earth orbit (LEO), the geo-stationary transfer orbit (GTO), or the operational orbit of communications satellites, geo-stationary equatorial orbit (GEO).

The problem addressed here is to find a combination of upper stages that could satisfy commercial market needs at the least life cycle cost to compete effectively with the French Ariane launch vehicle system.

StarCore I Configuration

Figure 15:
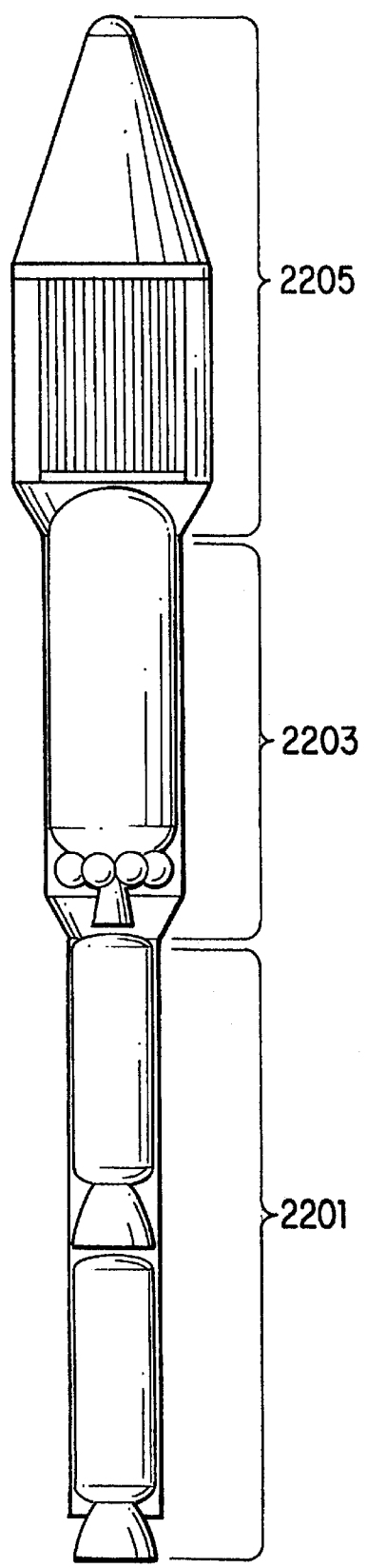
FIG. 15 shows the StarCore I expendable upper stage, which is optimized for use with the StarBooster 200 launch to GTO, GEO or the more recent "super synchronous injection" used for communications satellites with highly effective electric propulsion systems.

FIG. 15 shows the StarCore I, which is comprised of the lower two stages of the Athena II launch vehicle 2201 and the interstage adapter coupling these Alliant (Thiokol) Castor 120 solid rocket motor stages, plus the "front end" of the Atlas III launch vehicle: the Centaur stage with its single RL-10A4-1 engine 2203 and the largest of the Atlas III payload fairings, identified by Lockheed Martin as the Extended Payload Fairing 2205.

Increased structural loads and moments of this larger "front end" than is now seen on Athena may require strengthening of the Castor 120 side walls by the use of additional fiber overwrap during case manufacture. With the filament-wound-composite construction of these cases, this may be a simple as a software change. Motor re-qualification to the higher loads and moments must then be accomplished. Similarly, a structural review of the Athena II Stage 1 to Stage 2 adapter will be required and any necessary strengthening/requalification accomplished in parallel with the design and qualification of the new conical adapter to transition from the 92.9 inch diameter Castor 120 motor to the 120 inch diameter Centaur stage.

Software changes to the Atlas III software package will also be required to reflect this new configuration.

Altogether, these tasks are considered to be far less time-consuming and expensive than producing a similar "clean sheet" design for the same purpose.

StarCore I Performance

On Aug. 21, 1998, Dr. Ted Talay of the NASA Langley Research Center completed the task of estimating performance of dual StarBooster 200/two Castor 120 solid rocket motors (as used on Athena II), and the Centaur stage and payload fairing from Atlas III. His estimates used the industry standard POST 3D trajectory simulation program.

His POST results confirmed earlier estimates made by this author. Dr. Talay's results permitted a payload of 6.3 tons to GTO or, perhaps of greater benefit to customers, 3.26 tons (7,190 lbm) directly to GEO without need for an apogee kick motor and spin-stabilization of the payload for the transfer.

The Castor 120 motors price was quoted at $4.6 millions each in 1995. This, coupled with the $15 millions each price of the Centaur, and allowing $3 millions for the existing payload fairing and a new interstage adapter, results in a total cost of this upper stage complex of $27.2 millions. With the expected low costs of reusable StarBooster 200 flight compared to the use of expendable boosters, this complex is thought to be economically superior to any other present option for this class of performance.

For example, the version of Ariane 5, which has flown, delivers less than 6 tons for a price of $150 millions. Current efforts by Arianespace are to increase this performance to as much as 7 tons at a cost of $85 millions per flight. The reality of these goals is not yet known.

StarCore I, when launched by a pair of StarBooster 200 fully reusable boosters, is fully expected to meet this Ariane 5 upgrade challenge and to provide a superior service for a lower price than will other alternatives open to satellite owners.

Trajectory Time Histories

The Starcore I is an embodiment of the present invention that selects optimized upper stage for use with the Star-Booster. The Castor 120 solid rocket motors of the operational Athena II vehicle are used with the single engine Centaur stage from the Atlas III and the Extended Payload Fairing of this same vehicle to comprise a new "core" for the launch system. This "core" was mounted between two StarBooster 200 vehicles to complete the launch ensemble. The StarBooster-to-core attachment structure mass was estimated and included in this launch simulation.

Examination of the time histories of launch parameters derived by this POST run illustrate the importance of the fully reusable booster and offers insights into other aspects bearing on design of the system. The present purpose is thus to present these time histories with explanatory notes on their significance, as an adjunct to the earlier report mentioned above.

Although the printout of this POST run provides many parameters of importance, it was decided for this report to plot only five: mass, altitude, ideal velocity added by the launch system, boost phase Mach number, and boost phase dynamic pressure.

Figure 16:
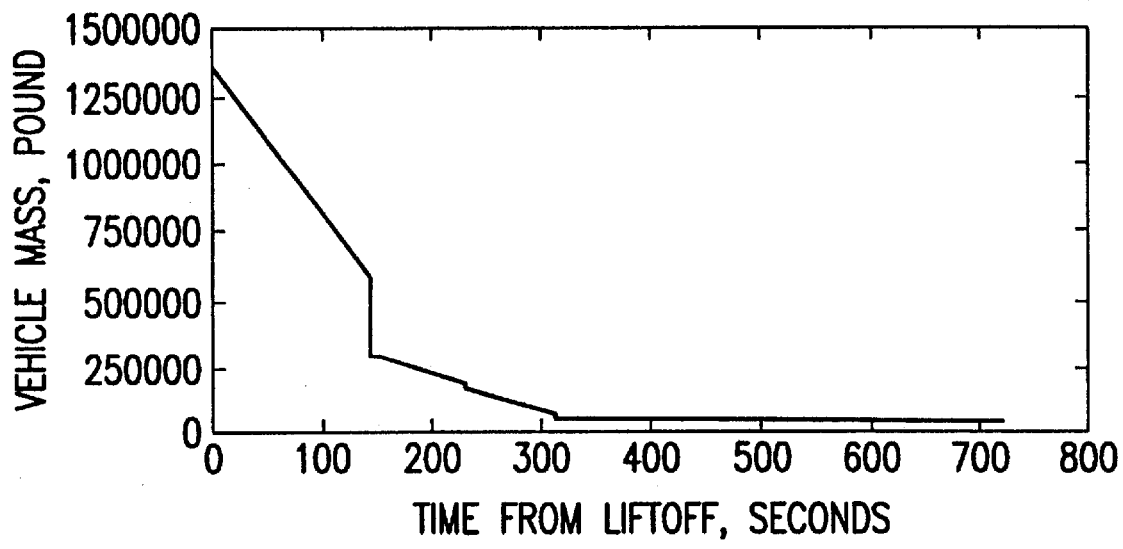
FIG. 16 is a graph showing the time history of the total mass of the multistage launch vehicle embodiment of the present invention comprising two StarBooster 200 as a first stage and StarCore I upper stages as function of time from lift-off from the launch pad. Note that over half of the vehicles total mass is expended by burnout indication the economic potential of this embodiment of the present invention.

FIG. 16 is the time history of the total mass of the vehicle as a function of time from lift-off from the launch pad. At burnout of the StarBoosters, over 58% of the lift-off mass (of 622.7 tons) has been expended. The sharp drop in mass at 145 seconds (140.8 tons) is due to staging of the two spent StarBoosters, which return to the launch site for reuse. A five second non-thrusting interval after StarBooster burnout is provided to allow time for safe separation of the StarBoosters from the core. This interval is the same as that provided by Orbital Sciences Corporation for separation of their Pegasus vehicle from its L-1011 carrier aircraft.

A pair of relatively inexpensive Castor 120 solid rocket motors then provides thrust in sequence until 315.5 seconds, reducing mass after staging to 3.5% (21.9 tons) of that departing the launch pad, and attaining Mach 19.7. The 3.3-ton payload fairing is jettisoned after separation of the first of the two Castor 120 motors. The Centaur stage is ignited 29 seconds after separation of the final Castor motor, permitting time for separation and Centaur "chilldown", then providing the thrust needed to place itself and its payload into low Earth orbit (LEO).

The mass of 13.4 tons, injected into a 100 NM circular orbit at 28.5 degrees, representing 2.15% of liftoff mass, consists of the 3.1 ton communications satellite, the Centaur stage inert mass of 1.83 tons, and over 8 tons of residual propellant remaining in the Centaur stage for use in the subsequent burns into GTO and GEO. Thus the payload to LEO is 11.3 tons, 1.8% of liftoff mass. Larger injected mass and payload can be delivered to LEO if more of the Centaur propellants are consumed. Alternatively, the slightly lower injected mass to the higher energy ISS orbit can provide a mix of "dry payload" and residual propellants to provide orbit makeup impulse for the space station.

Thus, this mass time history vividly illustrates the importance of recovering the first stage, as it is by far the largest inert element of the entire launch system.

Figure 17:
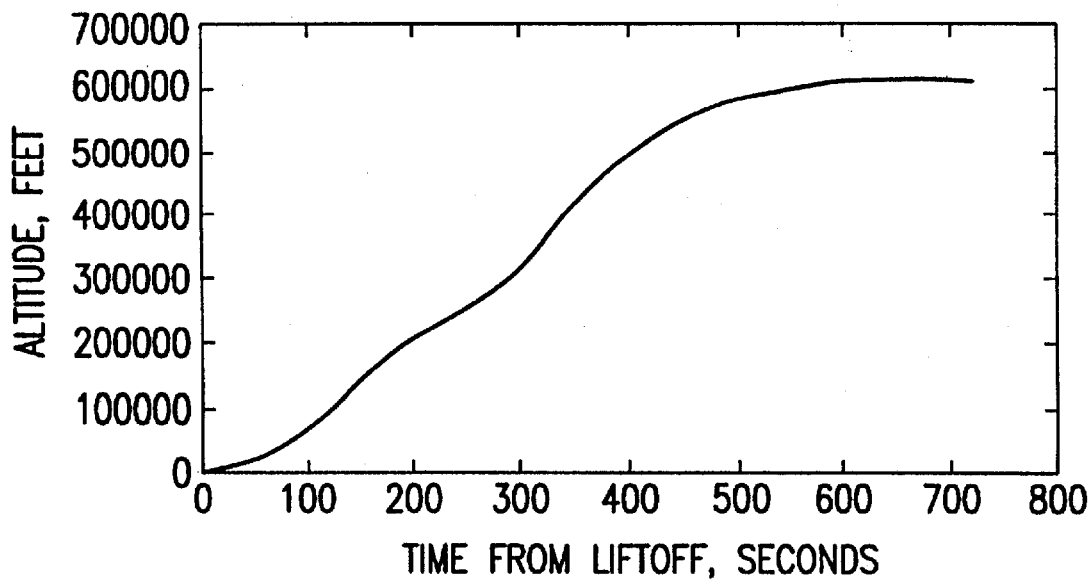
FIG. 17 is a graph showing the altitude time history of launch for the embodiment of the present invention comprising two StarBooster 200s as a first stage and an StarCore I upper stage. StarBooster staging occurs at an altitude of 39.9 kilometers (130,800 feet). Centaur ignition occurs above 120 km (400,000 feet) and insertion into LEO is at 185 kilometers, or 100 nautical miles.

FIG. 17 illustrates the altitude time history of launch. StarBooster staging occurs at an altitude of 39.9 kilometers (130,800 feet). Centaur ignition occurs above 120 km (400,000 feet) and insertion into LEO is at 185 kilometers, or 100 nautical miles.

Figure 18:
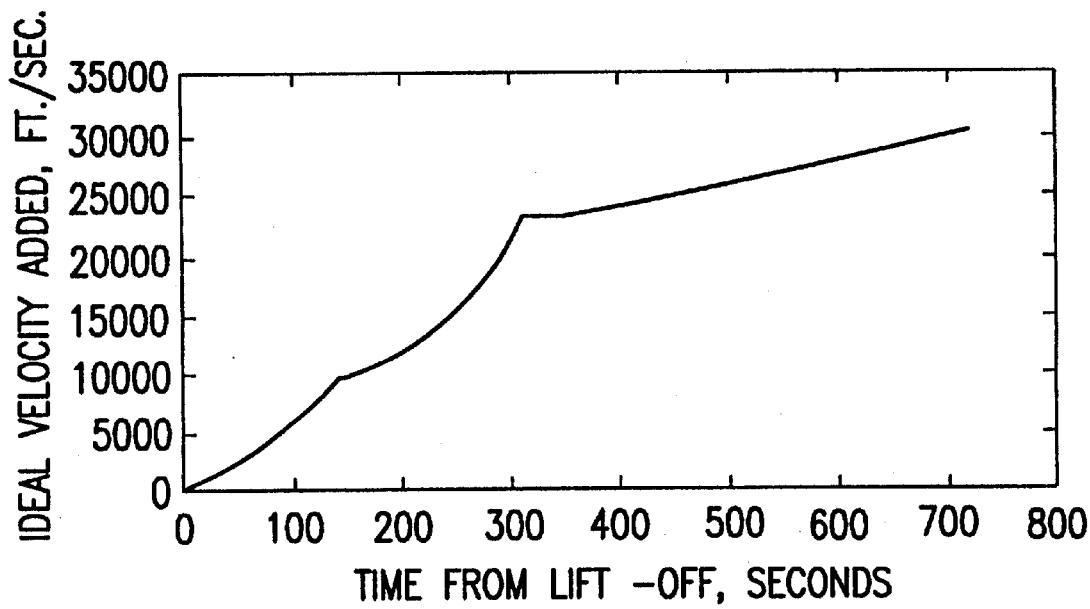
FIG. 18 is a graph that illustrates the time history of ideal velocity added by the propulsive elements for the dual StarBooster 200/StarCore I vehicle embodiment of the present invention. The ideal velocity added by the pair of StarBoosters is 2.9 kilometers per second (9,522 feet per second) resulting in a relative velocity over the Earth's surface of 1.63 km./sec. (5.338 ft./sec), or Mach 5.13; although half of the vehicle mass is consumed, only 20% of orbital velocity is attained, which illustrates the benefit of booster recovery. 4.1 kilometers per second (13,495 feet per second) is added by the pair of Castor 120 solid motors, and 2.17 km/sec. (7,105 feet per second) by Centaur to achieve LEO, leaving a large part of the performance capability of Centaur remaining for the transfer to GEO. Note the interval between 315 and 345 seconds where no velocity was added. This is the Centaur coast interval for chilldown and nozzle extension.

FIG. 18 illustrates the time history of ideal velocity added by the propulsive elements. Ideal velocity added by the pair of StarBoosters is 2.9 kilometers per second (9,522 feet per second) resulting in a relative velocity over the Earth's surface of 1.63 km./sec. (5,338 ft./sec), or Mach 5.13; 4.1 kilometers per second (13,495 feet per second) is added by the pair of Castor 120 solid motors, and 2.17 km/sec. (7,105 feet per second) by Centaur to achieve LEO, leaving a large performance capability remaining for the transfer to GEO. Note the interval between 315 and 345 seconds where no velocity was added. This is the Centaur coast interval for chilldown.

Figure 19:
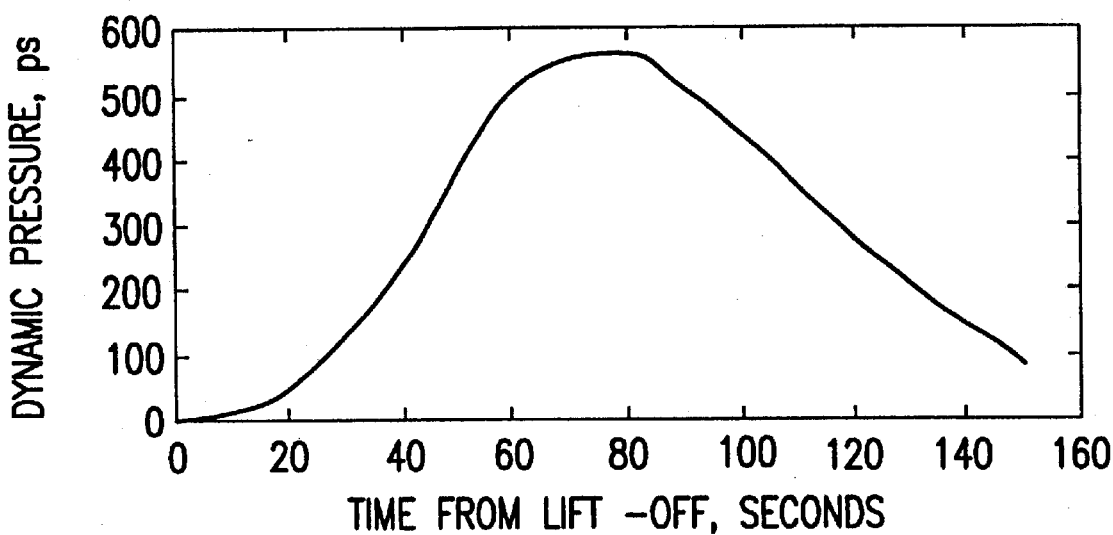
FIG. 19 is a graph that illustrates the time history of dynamic pressure during the boost phase of flight for the dual StarBooster 200/StarCore I embodiment of the present invention. This indicates that maximum stress upon the vehicle occurs midway through the booster light, one again illustrating the value of recovering the booster which must be designed to withstand these heavy loads.

FIG. 19 illustrates the time history of dynamic pressure during the boost phase of flight. Maximum dynamic pressure of 563 pounds per square foot occurs near 80 seconds after lift-off, at a Mach number of 1.46, rapidly decreasing to 113 pounds per square foot at StarBooster burnout. This peak dynamic pressure is considered to be a relatively mild launch environment when compared with that of most expendable launch vehicles, which should not cause undue difficulty to structural design.

Perhaps the most significant parameter to the design of the StarBooster thermal protection system is the time history of Mach number determining aerodynamic heating during both ascent and the subsequent re-entry as a part of the recovery flight.

Figure 20:
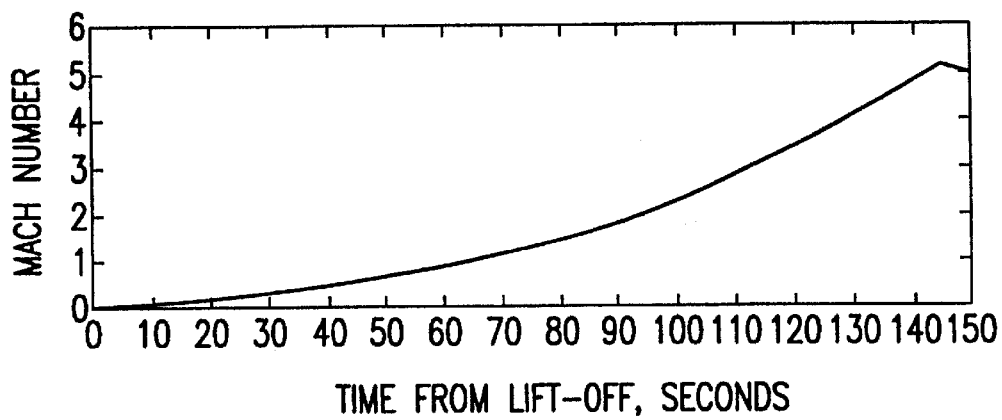
FIG. 20 is a graph showing the boost phase Mach number time history for the dual Starbooster 200/StarCore I embodiment of the present invention. Note that the Mach number at staging is just above Mach 5, indication the potential for use of inexpensive aluminum heat sink construction of thermal protection of the booster.

As a "heat sink" thermal protection system is planned for the airframe exterior, depending upon the thermal capacitance of the vehicle skin to absorb the heat pulse, the time of exposure is also of great importance to this design effort, determining the total heat load which must be absorbed without compromise of structural margins. FIG. 20 provides the Mach number time history for the boost phase of flight. The launch vehicle achieves supersonic flight at about 65 seconds from liftoff, passes through Mach 2 at 94 seconds, and spends only 51 seconds above Mach 2 until staging at Mach 5.13.

If future design effort indicates an absolute need to decrease this staging Mach number and/or dwell time to observe acceptable "heat sink" thermal protection capabilities with a cost-effective airframe, the propellant load of StarBooster may be reduced or the flight path altered. This measure will decrease staging velocity with only minor loss of orbital payload capability. Other candidate StarBooster missions involving cryogenic core stages will utilize "parallel burn" and may stage at much lower Mach numbers; Mach 3.45 in one study of a closely related human space flight vehicle using an earlier, larger version of StarBooster.

As a point of comparison, the nation's first hypersonic piloted research aircraft, the X-15, conducted 199 flights with three airplanes during the interval 1959–1968; 111 of these going beyond Mach 5 and many of the remainder closely approaching this velocity. Although the data was not found in this research, it is thought that many of these flights maintained the high Mach number flight for sustained intervals. With its Inconel X skin, it was capable of transient flight to Mach 7 without adding skin thickness to the wings beyond those dictated by structural requirements (0.05 to 0.10 inch thickness).

Although careful attention must be paid to accommodating non-uniform heating and avoiding possibly excessive loads, the "heat sink" design approach has been favored since 1970 for numerous recoverable space booster studies; most of them using aluminum skin. Presently, both Lockheed Martin and Boeing are engaged in studies of such aircraft to serve as Liquid Flyback Boosters (LFBB) to replace the solid rocket boosters of the Space Shuttle by the middle of the next decade.

With this rich legacy of flight research and analytical data, coupled with the vast amount of high speed flight data gathered by the Space Shuttle passing through the velocity regime of interest, the design of a largely aluminum heat sink structure for StarBooster is considered to be both feasible and low risk.

Titan IV-B with StarBooster 400

Recently, the announcement was made that Lockheed Martin will plan to serve the USAF Evolved Expendable Launch Vehicle-Heavy (EELV-H) requirement with an improved, lower cost version of Titan IV, the vehicle now performing that mission.

One candidate means of achieving major reductions in the cost of launching the Titan IV has been indicated by studies performed addressing a similar situation faced by NASA: the need to reduce costs and to improve safety. These needs have lead NASA to consider a new, 1.1 million pound propellant capacity, Liquid Flyback Booster (LFBB). The Boeing report on this NASA-sponsored work indicates that very large savings in cost-per-flight of the Space Shuttle, 88% of present booster costs, will be experienced by replacing the current Revised Solid Rocket Motors (RSRMs) with LFBBs.

The StarBooster 400 vehicle delivers 38% more total impulse than does the present Titan IV Solid Rocket Motor Upgraded (SRMU), strongly indicating the potential for a large performance increase. As the Titan missions are unmanned, the NASA LFBB requirements for "engine out" and "eliminate abort restrictions" are not expected to apply to this possible application. A preliminary performance analysis was conducted to quantify the prospective performance increase of converting Titan IV from expendable to fully reusable liquid propellant boosters using StarBooster 400.

First, a check of liftoff thrust-to-mass ratio indicated that a still satisfactory ratio of 1.31 exists by "series burn" of the dual StarBooster 400/Titan IV-B core "stack" (i.e., Titan core is quiescent for liftoff and early boost.)

Second, the current delay time in igniting the LR-87 engines of the Titan first stage was extended to the full duration of the twin StarBooster first stage, about 145 seconds. This step was taken to assure that the StarBooster 400 burnout velocity did not exceed its heat sink thermal protection velocity limit. This measure proved successful in achieving this goal. Possible impacts upon and changes to the Titan IV core have not yet been examined.

Figure 21:
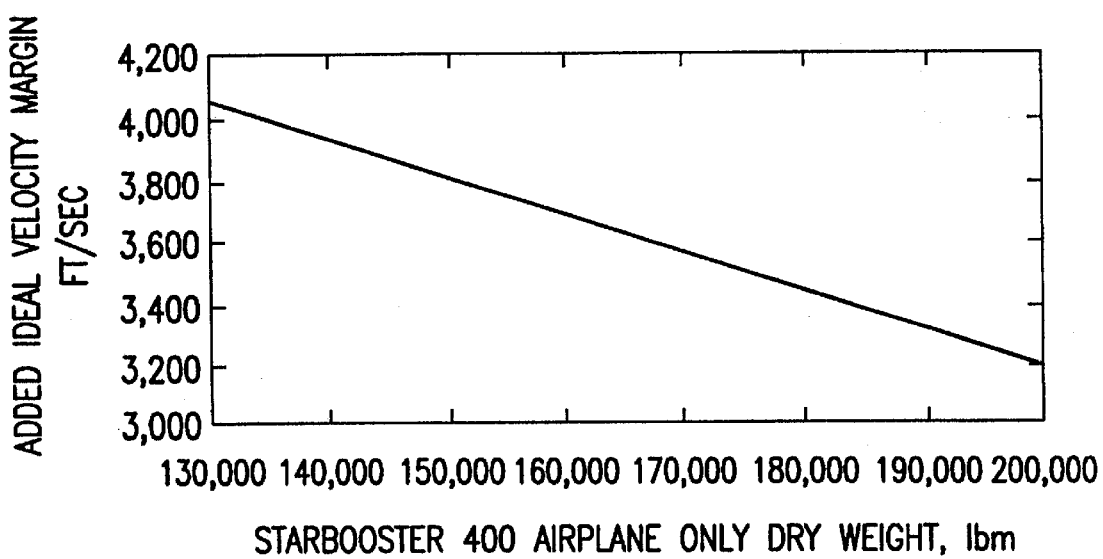
FIG. 21 is a graph showing the velocity margin increase as a function of dry aircraft weight for the multistage launch vehicle embodiment of the present invention comprising two StarBooster 400s as a first stage and a Titan IVB as the upper stages. This is indicative of the large performance increase that can be achieved by replacement of the Titan SRBs with the flyback booster embodiment of the present invention.
Figure 22:
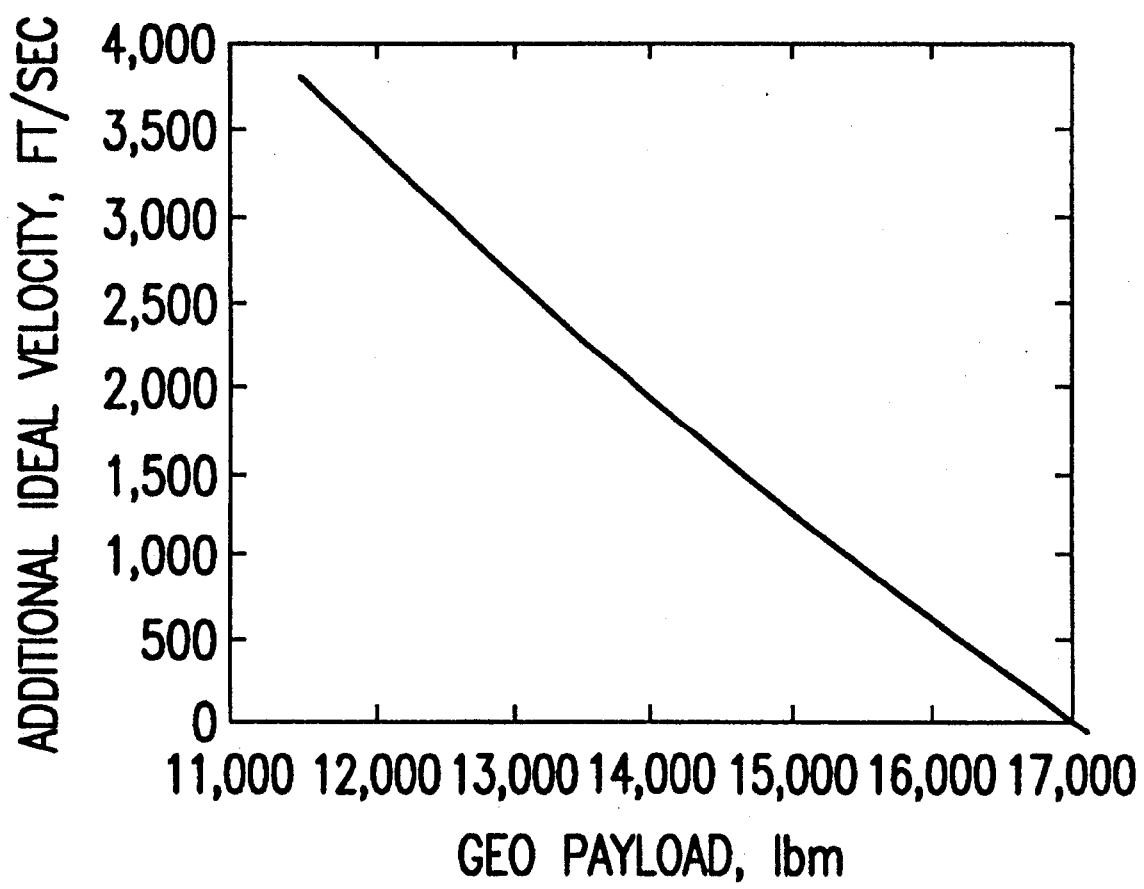
FIG. 22 is a graph showing mass delivered by the dual StarBooster 400/Titan IVB embodiment of the present invention to Geo-Stationary Circular Orbit if 25% is any gain in payload beyond the 11,500 pound capability of currently operational Titan IVB is invested in the added mass necessary to improve the performance of the Centaur upper stage. An additional 400-ft./sec. velocity loss was assumed to make this assessment more conservative.

FIGS. 21 and 22 indicate preliminary results of this performance analysis. FIG. 21 shows the velocity margin increase of the Titan IV with two StarBooster 400s as a first stage. This chart acknowledges that present structural limitations of the Centaur third stage of the Titan IV core limit the payload to geo-stationary circular orbit to 11,500 pounds, below the performance potential of the present Titan IV-B. For this reason, the performance increase consequent to this upgrade to fully reusable StarBooster 400 liquid propellant boosters cannot now be used to increase payload mass, but rather is expressed as an increase in ideal velocity margin. Note that a very large 3,200 ft/sec. margin persists even should the dry mass of the StarBooster 400 aircraft approach 200,000 pounds, near the current prediction for the much larger LFBB for NASA. A 400 ft./sec. increase in mission ideal velocity was assumed for this analysis to account for the increased gravity and drag losses expected to occur with this booster replacement. Large ideal velocity margins remain under worst-case assumptions of both airplane mass and velocity loss.

Of much greater importance than performance, however, may be the operational benefits attained by converting to boosters that can be loaded with their propellants via pipeline to the launch pad rather than in segments loaded in factories far away. This will eliminate the labor-intensive assembly of the SRMU segments at the launch site and eliminate (until liquid propellant loading late during the launch pad stay) the hazardous operations restrictions that now apply. It will also expedite launch pad assembly due to greatly reduced mass to be managed prior to propellant loading via pipeline.

Also, operational cost-per-flight advantages of the fully reusable StarBooster 400 are expected to contribute to the cost savings of operating this large, and now fully modernized, space launch vehicle.

Upgrades to the Centaur stage may also be anticipated for future use of the Titan IV. These upgrades may include conversion to the single RL-10 version, increases in the tank capacity for oxygen/hydrogen propellants, avionics and other sub-system upgrades, and strengthening of the structure to permit more massive payloads.

FIG. 22 shows the GEO payload of a Titan IVB with dual Starbooster 400's as a first stage when it is assumed that 25% of any gain in payload beyond the 11,500 pound capability of the Titan today is invested in the added mass necessary to strengthen Centaur. An additional 400-ft./sec.-velocity loss was assumed to make this assessment conservative.

The combined effects of increasing the payload capability of Centaur and of airplane dry mass increases may be estimated by reference to both charts. If, for example, it is assumed that the StarBooster 400 airplane dry mass is increased from 150,000 to 200,000 pounds, velocity margin decreases from 3,800 ft/sec to 3,200 ft. sec, an 800 ft/sec. decrease in the margin provided by these more powerful boosters.

Applying this as a requirement to the data of FIG. 22 indicates that the net GEO payload may decrease under these adverse circumstances from 17,000 pounds to 15,500 pounds, which still represents a 4,000-pound, or 35% increase in present Titan IV-B capability. Thus the StarBooster 400 as a part of the Titan IV-B system now appears to offer a large increase in performance, large reductions in heavy launch costs, and increased safety.

What is claimed is:

1. A flyback booster for vertically launching a payload, releasing the payload and landing on a runway comprising:

an aircraft having an airframe made primarily of aluminum designed to operate in the flight regime from vertical launch to Mach 6;

a separable rocket propulsion module comprising at least one stage of a space launch vehicle, said module being functionally housed within said aircraft;

attachment means for releasably attaching the aircraft to said payload;

thrust structure means for transmitting thrust produced by the propulsion module to the payload;

landing means including air breathing engine means for providing flight propulsion for the aircraft after said payload has been released until the aircraft lands on said runway;

an intelligent aft section flight control means for assisting to control the flight of the aircraft after said payload has been released until the aircraft lands on said runway;

said air breathing engine means comprising:

a blow off nose releasably fixed to the front to the aircraft;

an air inlet configured for supersonic and subsonic operation disposed behind the blow off nose;

a pair of turbofan jet engines, each said jet engine having an air intake and a thrust outlet, said engines being disposed side by side within the front of the aircraft and having their air intakes in fluid communication with said air inlet, the centerline of said engines being fixed within the body of the aircraft off the centerline of the aircraft by up to 15 degrees;

said jet engine outlets further being in fluid communication with the exterior of the aircraft; and a pair of blow off aerodynamic covers releasably fixed on each side of the aircraft over each of said jet outlets.

\* \* \* \* \*